United States Patent [19]

Weingartner et al.

[11] Patent Number: 5,085,487
[45] Date of Patent: Feb. 4, 1992

[54] SEAT WITH FOAMED PLASTIC PADDING AND PROCESS FOR ITS MANUFACTURE

[75] Inventors: Rudolf Weingartner, Neuhofen a.d. Krems; Johann Moseneder, Grieskirchen; Bernhard Eder, Linz/Donau, all of Austria

[73] Assignee: Schaumstoffwerk Greiner Gesellschaft mbH, Kremsmunster, Austria

[21] Appl. No.: 643,854

[22] Filed: Jan. 18, 1991

Related U.S. Application Data

[62] Division of Ser. No. 458,733, Dec. 13, 1989.

[30] Foreign Application Priority Data

Jun. 2, 1987 [AT] Austria .................................. 1396/87
Dec. 9, 1987 [AT] Austria .................................. 3224/87
Apr. 20, 1988 [AT] Austria .................................. 1005/88
Jun. 3, 1988 [WO] PCT Int'l Appl. ... PCT/AT88/00041

[51] Int. Cl.⁵ ............................................. A42C 27/14
[52] U.S. Cl. ................................. 257/452; 257/DIG. 1; 257/DIG. 5; 5/481; 5/459
[58] Field of Search .......... 257/452, DIG. 1, DIG. 5; 5/457, 481, 448

[56] References Cited

U.S. PATENT DOCUMENTS

| 4,031,579 | 6/1977 | Larned ........................... 297/DIG. 5 |
| 4,060,280 | 11/1977 | Van Loo ........................ 297/DIG. 5 |
| 4,184,237 | 1/1980 | Blankenship ......................... 5/481 X |
| 4,190,697 | 2/1980 | Ahrens ........................... 297/DIG. 1 |
| 4,486,493 | 12/1984 | Burmester et al. ................... 5/481 X |
| 4,618,532 | 10/1986 | Volland et al. ...................... 5/481 X |
| 4,736,911 | 4/1988 | Heitmann ....................... 297/DIG. 5 |
| 4,793,574 | 12/1988 | Fenske et al. .................. 257/DIG. 5 |
| 4,892,769 | 1/1990 | Perdelwitz et al. .......... 297/DIG. 5 |
| 4,903,358 | 2/1990 | Creyf ................................... 5/459 |
| 4,930,173 | 6/1990 | Woller ............................ 297/452 X |

Primary Examiner—Peter A. Aschenbrenner
Attorney, Agent, or Firm—Kurt Kelman

[57] ABSTRACT

The invention relates to a seat, in particular for vehicles, with a padding of foamed plastic with a supporting body made of an open-cell elastic plastic foam having a first specific gravity and with a flame-retardant layer made of an open-cell elastic plastic foam having a second specific gravity different from the first, and/or an upholstery material, which are connected with each other, in particular are glued in places.

55 Claims, 11 Drawing Sheets

SEAT WITH FOAMED PLASTIC PADDING AND PROCESS FOR ITS MANUFACTURE

This is a divisional of copending application Ser. No. 07/458,733 filed on Dec. 13, 1989.

The invention relates to a seat, in particular for vehicles, with a padding of foamed plastic with a supporting body made of an open-cell elastic plastic foam having a first specific gravity and with a flame-retardant layer made of an open-cell elastic plastic foam having a second specific gravity different from the first, and/or an upholstery material, which are connected with each other, in particular are glued in places.

A known seat with a padding of foamed plastic—in accordance with WO-A1-87/06894 of the same applicant—consists of a foamed plastic with a supporting body made of an open-cell elastic plastic foam having a first specific gravity and with a flame-retardant layer made of an open-cell elastic plastic foam, provided with flame retardant, having a second specific gravity different from the first. The plastic foam and the flame-retardant layer are connected with each other, in particular through a foaming process, and are surrounded by an upholstery material which is flame-resistant. In order to achieve a sufficient permeability to air of such a padding, it was also proposed, after the completion of the padding, to push preferably heated needles through this padding, so that a corresponding exchange of air is possible. These paddings have proved, in themselves, to be very good in practice, but it has been found, however, that especially in extreme weather conditions or under various climatic conditions the comfort of the seats was not sufficient for the planned purpose of use in vehicles.

In addition, seats for public transport are already known—in accordance with DM-GM 85 06 816—which have a seat padding which is covered with a seat upholstery, in which the seat upholstery and padding consists of a flame-resistance and smokeless material. Frequently, one proceeds here such that between the flame-resistant seat upholstery and the seat padding, which mostly consists of plastic foam, a glass fibre mat is arranged, which is intended to prevent the seat upholstery burning through in the direction of the seat padding. However, it has found here that in many cases the action of the flames originates from the floor, and the plastic foam of the seat padding tends to burn with the development of thick smoke, whereby the public transport is filled with smoke in a very short period of time, when a fire occurs, so that it is scarcely possible for the occupants to find their way. Accordingly, in this known seat, provision is made that beneath the seat padding in the supporting frame of the seat a fire-resistive plate is arranged. This requires the use of a special section for the mounting of the seat padding and also an additional expenditure through the arrangement of the fire-resistive plate. Also, the seat ventilation was not satisfactory in this form of embodiment.

Seats with padding of foamed plastic are very widely used in modern vehicle construction. Above all, they are used in rail and road vehicles, but also, predominantly in aircraft. Whilst the regulations which apply to rail vehicles as regards the self-extinguishing structure of the materials used or respectively as regards the generating of smoke, prescribe very strict guidelines, these regulations are further exceeded by the regulations which apply in the aircraft industry. Thus, in seats which are permitted for use in aircraft, a test is prescribed, in which the paddings are directly exposed to a flame from a burner, in their composition as provided for installation. This flame acts directly on the padding for a period of 2 minutes, after which the flame is extinguished or respectively removed. If the flames have not extinguished themselves until then, the padding is extinguished after 5 minutes. After this fire test, the weight loss of the padding must not be higher than 10%. In order to fulfill these extremely strict regulations, and at the same time to achieve a high degree of comfort in the seats in the case of long-haul flights, and to achieve a low weight, seat paddings of various elastic, open-cell soft foam materials, provided with flame retardants, and having differing specific gravities, were glued together.

Such a known vehicle seat—in accordance with EP-A1 190 064—consists of several layers of needle fleece which are surrounded by a non-flammable upholstery material. Between the upholstery material and the individual layers of needle fleece, reinforcement mats of metal or respectively glass fibres are arranged, in order to reduce damage by vandals. Through the glueing of the individual layers and the many intermediate layers of this vandal-protection layer, it is even more difficult to achieve a sufficient ventilation in the known vehicle seat.

In another seat for aircraft, in order to create the complex spatial profiling of the seat paddings more simply, the supporting body is formed from a piece which is treated with flame retardants and is foamed in one piece in a mould, the surface of which piece is covered with a flame-retardant layer and thereafter with a non-flammable upholstery material. In the known seats, however, the new, increased safety specifications and testing regulations for aircraft seats could not be fulfilled.

The invention is based on the problem of creating seat for vehicles, in particular for means of transport, such as rail vehicles or respectively aircraft, which makes possible a sufficient ventilation and hence a favourable climate for sitting. Moreover, it should offer a high degree of resistant to burning loss over as long a period as possible, even when directly attacked by flame. In addition, even when directly attacked by flame, there should also be a negligible weight loss or respectively as negligible a generation of smoke as possible. Furthermore, the use of a foamed shaped part should be possible for the supporting body, and the expenditure for the manufacture of such a seat or respectively padding should be kept low. In addition, a resistant attachment of the connecting device should be achieved for the mounting of the upholstery material of the padding.

This problem of the invention is solved in that between the supporting body and the flame-retardant layer and/or the upholstery material, a non-flamable intermediate layer is arranged, which is formed from a lattice or mesh of high temperature resistant fibres or threads, and/or is liquid repellant, and the preferably the supporting body is foamed on to this intermediate layer. The surprising advantages of the finding according to the invention lie in that contrary to the constructions used hitherto, through the use of intermediate layers constructed accordingly, the supporting body is produced either in its own foaming process, independently of the manufacture of the seat, or else can be connected with the flame-retardant layers or respectively the upholstery material directly through foaming on. A further supplementary piece can be achieved with the use of non-flammable plastics, which offer a higher resistance to burning loss and the same time to improve the removal of air or respectively ventilation of the surface of the seat or respectively to maintain the inherent stability of the supporting bodies. If a non-flammable intermediate layer is used, it is surprisingly achieved that the charred residual components of the flame-retardant layer can settle on the high temperature resistant fibres of threads, whereby the penetration of the flames into the foamed plastic of the supporting body lying behind is made additionally more difficult. A further surprising advantage of this solution lies in that these high temperature resistant fibes or respectively threads bring about a good thermal insulation and delay a direct transfer of heat between the flame-retardant layer which is charring in the region of the flames, and the plastic foam of the supporting body arranged behind it, and consequently also the foam of the supporting body can not disintegrate through the action of heat. The direct ignition of the plastic foam in the region of the supporting body through the high temperature is prevented by the added flame retardants. A further surprising effect of the solution according to the invention, however, lies principally in that an essential factor is no longer the construction and composition of the upholstery material, because a flame-retardant effect can already be achieved through the composite effect of the flame-retardant layer with the supporting body and the intermediate layer arranged therebetween. The lattice-or mesh-shaped structure of the high temperature resistant fibres or threads forms an additional protective effect against the flames acting externally on the padding, because the flame can only penetrate the mesh with difficulty. Moreover, after the direct action of the flames is over, a rebound of the flames from the interior of the padding to the outer side can no longer arise.

However, an embodiment is also advantageous, in which the intermediate layer is formed from a mesh or knitted fabric of threads and or fibres or of a flame-resistant material, or in which the intermediate layer is formed by a lattice of threads and/or fibres. Through the greater strength of the intermediate layer, it is made additionally more difficult for the latter to be burnt through.

However, an embodiment is also advantageous, in which a mesh aperture of the lattices or respectively meshes or knitted fabrics is approximately 0.5 to 8 mm, preferably 3 mm, because with the remaining charred residual materials in the burning loss of the flame-retardant layer, a dense protective layer or respectively soot layer can be formed on the mesh or lattice of the intermediate layer, which is not penetrated so rapidly by the flames.

However, it is also advantageous if the fibres or threads consist of glass and/or ceramic material, or if the fibres or respectively threads consist of metal and-/or carbon, because thereby a melting of the supporting parts of the intermediate layer is avoided and hence a disintegration thereof.

According to a further embodiment, provision is made that the intermediate layer is connected with the supporting body and the flame-retardant layer in regions distributed over the surface and a distance from each other, whereby a sparking of the flames in the region of the connection sites between the flame-retardant layer and the supporting body is prevented and a sufficient comfort is achieved on the padding with a good exchange of air.

According to another further development, provision is made that the connection of the supporting body and/or the intermediate layer and/or the flame-retardant layer and/or the upholstery material takes place by an adhesive which is applied in the regions, or by the foaming on of the supporting body or of the flame-retardant layer, whereby a connection between the individual layers is achieved, which is as permeable to air as possible.

According to another variant embodiment, provision is made that the upholstery material is laminated onto the intermediate layer and preferably a connecting layer, e.g. a polyether- or polyester foam layer is glued thereto, which connecting layer is arranged between the upholstery material and the intermediate layer. This form of embodiment has the advantage that the insert pieces can be pre-fabricated with the upholstery material in a sufficient quantity and in the desired shape, whilst shortly before delivery, only the voluminous supporting body can be foamed on. Through the use of a sandwhich structure, however, the upholstery material achieves a sufficient stability of shape, not least through the connecting layer arranged between it and the intermediate layer, so that it can be stored without losing its shape.

A further development is also advantageous, in which the plastic foam of the supporting body is mixed with a flame retardant, in particular is powered form, which causes the layer of the supporting body situated behind the charred remains of the flame-retardant layer to be unable to ignite itself owing to the high degree of radiation- or respectively convection heat.

A construction is also advantageous, in which the supporting body is constructed in one piece, because thereby it can be produced from a shaped part in one piece, for example in a foam mould according to the desired three-dimensional shape, in one operating step.

It is also advantageous if the supporting body consists of a plastic foam with a uniform specific gravity, because the expenditure for the foam mould and the foaming machines can be kept low.

A multiple advantage is offered by an embodiment in which the specific gravity of the plastic foam is approximately 15–60 kg/m$^2$, because thereby on the one hand a higher stability of the padding becomes possible in the more intensively stressed regions and on the other hand a higher degree of filling with pulverulent flame retardants becomes possible.

However, it is also advantageous if the intermediate layer has a weight of approximately 150–350 kg/m$^2$ and/or the flame-retardant layer has a specific gravity of approximately 20–60 kg/m$^2$, or that the flame-retardant layer is surrounded by an upholstery material which is flame-resistant, because thereby the resistance to fire can be additionally further increased.

According to another form of embodiment, provision is made that the intermediate layer is formed by a barrier film, in particular a PE- or PU film, in particular with a thickness of 50 $\mu$m, whereby it is possible to produce the supporting body from a shaped foam which can be foamed directly onto the flame-retardant layer.

According to a further advantageous embodiment, provision is made that different cross-sectional slices of the supporting body, which are spaced apart from each other and run parallel and/or vertically to one surface, have the same thickness, a different weight and/or ratio between recesses and foamed plastic. Through steps it is possible, in addition to an alteration to the spring characteristic of the seat or respectively supporting body, to alter the passage of air through the seat, for example through the flame-retardant layer or respectively the supporting body, to a desired extent, in order to thus be able to adapt the permeability to air to the differing arrangement of the layers or respectively their thickness or density. In addition, through this step, the weight of the seats can also be varied, in order to be able to adapt this to differing weights of the supporting layer, for example when a higher degree of filling with pulverulent flame retardants is necessary, and in order to keep this to a desired magnitude.

According to another variant embodiment, provision is made that recesses are arranged in the supporting body from one side-and/or rear face thereof, extending in the direction of the opposite side-and/or upper face. Through the size of the recesses and their arrangement or respectively distribution in the padding, the region of the seat surface can be constructed so as to be more resistant and rigid, whilst the regions adjoining thereto, extending up to the side faces, can be constructed so as to be softer and hence also with a lower weight. In addition, through the selection and position of the recesses, it is possible to vary the throughput of air through the seat vertically to the surface, i.e. through the flame-retardant layer, within wide ranges.

According to another further form of embodiment, provision is made that the recesses extend only over a portion of a supporting body thickness and/or a supporting body width, because thereby a good exchange of air and a control of stability in line with specific objectives can also be achieved in a lateral direction.

According to another further embodiment, it is possible that the recesses are formed by a cylinder and/or a cone and/or a pyramid. Through the shape of the recesses, in an attack by fire, the development of heat or respectively the burning loss behaviour can be favourably influenced, whereby through this construction of the recesses, despite the reduction in weight and the alteration to the elasticity and also the improved ventilation, a sufficient stability and rigidity of the seat can be achieved.

It is also possible that a volume and/or a depth of the recess is different in different regions of the supporting body, whereby the drawing off of the necessary quantities of air can be adapted to the differently stressed regions of the seat, without a disadvantageous alteration to the comfort of the seat and the stability. Thus, it is advantageous if for a better ventilation in the region of the bottom or upper thighs and also in the region of the lumbar vertebrae, a greater quantity of air can be withdrawn through the seat, because when the seat is used for a lengthy period of time, as is the case for example on overseas flights or lengthy rail journeys, a formation of condensation water or respectively an unpleasant sweating of the user of such a seat can occur very soon, through insufficient ventilation. This phenomenon is further intensified if in the course of the journey there is an extreme change of climate, for example from a high alpine climate into a mediterranean climate, or from the continental European climate to an exotic climate, such as for example in flights from Europe to South America.

However, it is also advantageous if the depth and/or the volume and/or a number of recesses is less in more highly stressed zones. Through the suitable selection of the depth, the volume and the number of recesses in more highly stressed zones, for example through the use of a greater number of very deep recesses with smaller volume—which weaken the stability of the supporting body or respectively the seat less—nevertheless a sufficient throughput of air can be achieved.

However, it is also possible that the zone is a central seat surface in a supporting body which is used as a seat padding, because especially this region places high requirements on the inherent stability of the seat and on the permeability to air.

According to another variant embodiment, provision is made that the depth and/or the volume and/or the number of recesses in a seat padding increases from the central seat surface in the direction of the lateral faces. Through the increasing number of respectively increasing volume or the depth, in the direction of the lateral faces, a higher throughput of air can be achieved in the lateral regions, which in all leads to an improved cooling of the seat, so that a build-up of heat or overheating can also be reduced in the region of the central seat surfaces.

It is also advantageous, if the number and, if applicable, the volume and/or a cross-sectional area of the recesses parallel to the surface of the seat—or respectively back padding in the regions of a back padding and a seat padding facing each other, is greater than in the other regions thereof. Through these features, it is surprisingly possible to adapt the seating climate to the person in the individual seats as well as possible, because above all in those regions in which a formation of sweat occurs when a seat is used for a lengthy period of time, this formation of sweat can now be advantageously prevented.

It is also advantageous here if the recesses are arranged merely in the regions of the seat and back padding which face each other, because thereby the adtional expenditure for the production of recesses can be restricted to the extent which is absolutely necessary.

It is advantageous here if this region in each case extends over approximately 30% of a length of the seat padding or respectively back padding running vertically to the back padding or respectively seat padding, because thereby the most essential regions for the climatic conditioning of the seat can be covered.

However, it is also advantageous if the recesses extend into the region of the intermediate layer, because thereby a connection is facilitated between the recess and the connecting layer arranged on the opposite side of the supporting body, or the upholstery material or respectively the openings or open cells thereof after the foaming-on of the supporting body.

According to another further development, provision is made that the intermediate layer is provided with an opening in the region of the recess. Thereby, a direct exchange of air is achieved between the flame-retardant layer and the recess.

According to another form of embodiment, provision is made that an interior of the recesses is directly connected with an interior of open cells of the flame-retardant layer, because thereby the resistance to the passage of air is less and when the person using the seat moves, this leads to a withdrawal of the air out of the seat region and a drawing in of fresh air into the region of the seat through the flame-retardant layer.

It is also possible that a cross-sectional area of the opening corresponds to a cross-section of the recess in the region immediately adjacent to the intermediate layer, so that the entire cross-sectional area of the recess can be used for the exchange of air.

However, it is also possible that the flame-retardant layer and, if applicable a flame-resistant upholstery material in front is provided with bores having a small cross-section, for example 0.5-5 mm, which open out into the interior of the recesses, whereby the passage of air through the layer which can not be provided with any recesses because of stability against burning loss, can nevertheless be altered such that a sufficient ventilation can also be achieved through the flame-retardant layer.

According to another advantageous further development, provision is made that a supporting device, in particular a spring core, e.g. of metal wire, is foamed-in in the supporting body in the region of the more intensely stressed zone, whereby the reduced stability or respectively resistance caused by the recesses for an improved ventilation can be balanced out again and hence the foam material of the supporting body can also retain its shape over a longer period of use.

According to another further development, it is advantageous if a base surface of the spring core is arranged approximately flush with an underside of the supporting body, because thereby a major part of the stress acting on the spring core can be carried off into a supporting structure and hence the shearing stresses exerted onto the supporting body can be reduced by the spring core.

It is also advantageous if a cover surface of the spring core is arranged at a distance from an upper side of the supporting body, in particular at a distance of 5 to 70 mm, because thereby already from the outset, a disadvantageous alteration to the comfort of the seat can be prevented. Through the selection of the distance between the upper side of the supporting body and the cover surface of the spring core, moreover, the spring characteristic of the seat can be better adapted to the individual wishes of the customer.

It is also advantageous, if a height of the spring core which is foamed into the supporting body, is less than a thickness of the spring core in unstressed state, because in this case, through a pre-stressing of the spring core and an alteration of the spring characteristic ensuing therewith, the action of the spring core only begins after a certain stress. Thereby, in the case of people of low weight, the spring core hardly comes to bear at all, whereas in the use by people with a greater weight, it takes up a part of the weight and hence protects the plastic structure of the supporting body from overstressing.

It is advantageous here, if the base face and the cover face of the spring core are spaced apart from each other by means of tensioning elements, the length of which, running vertically to the base face is less than a thickness of the spring core in unstressed state, whereby through an alteration of the distance between the base fase and the cover face, the spring characteristic of the spring core can be altered.

According to another advantageous embodiment, provision is made that the end face edges of the spring core are arranged at a distance from the lateral faces and a rear end face of the supporting body. Through this arrangement of the spring core, it is achieved that in the case of a fire, the spring core is insulated by the plastic foam which surrounds it, and hence the increase in temperature of the spring core is reduced. Thereby, it can be prevented over a long period of time, that the spring core begins to glow. In addition, back ignition through the glowing spring core can be avoided, when the fire extinguishes itself through the self-extinguishing properties of the supporting body or respectively the flame-retardant layer.

It is also advantageous if recesses are arranged, running in the region of the spring core vertically to a lateral and/or upper face of the seat padding, because thereby a sufficient quantity of air can be carried away through the seat, even through the region in which the spring core is arranged, so that the seating climate of such a seat is not disadvantageously affected by the spring core.

Provision is further made that an upper face of the recesses is arranged at a distance from the spring core or respectively parts of the spring core; thus it is prevented that in the case of a fire the spring core can not also heat up too rapidly through the hot fire gases, whereby the security against back-ignition can be further increased.

However, it is also additionally possible that in the supporting body between the lateral edges of the spring core and the lateral faces of the supporting body, recesses are arranged running vertically to the upper and/or lateral face of the supporting padding, because by means of the recesses running vertically to the upper face, a sufficient exchange of air is achieved, whereby through the recesses running vertically to the lateral faces of the seat padding, these recesses can be compressed when a person is using the seat, so that they act in the manner of a bellows and lead to an automatic removal of air or respectively ventilation of the seat. This is especially because through the vibrations of the vehicle or respectively the movements of the user on the seat or through the shifting of the body of the person using the seat, even during use a sufficient exchange of air can take place via these recesses.

According to a further advantageous embodiment, provision is made that the intermediate layer and/or the flame-retardant layer covers an inlet opening of the recesses in the region of the lateral and/or rear face of the supporting body, whereby an ingition of the supporting body in the region of the surface of the recesses is reliably prevented. However, a further surprising advantage is that through the columns of air present inside the supporting body, an additional insulation arises against the passing on of the heat generated by the flames, so that the plastic foam can offer a resistance against a greater attack by fire in the region of the supporting body.

However, it is also advantageous, if a surface of the recesses is lined with the intermediate layer and/or the flame-retardant layer, because the exchange of air is faciliated through the flame-retardant layer lying closer to the surface of the seat.

However, it is also possible that a surface of the recesses is coated with a flame-retardant layer, whereby the expenditure for the flame-retardant insulation of the recesses can be reduced.

In addition, it is also possible that a connecting device is arranged between the flame-retardant layer and an upholstery material and is directly connected with the intermediate layer. The advantages lie in that through the connection of the connecting device with the tear-resistant intermediate layer, the flame-retardant layer, which does not have a high load capacity, is given excess pressure, without its flame-proofing effect being hindered. It has been found as a surprising further advantage in experiments, that through the arrangement of the intermediate layer between the elastic flame-retardant layer and the supporting layer, the upholstery material of seats constructed in such a way can be protected and thereby the lifespan of the very expensive upholstery materials can be considerably increased.

According to another form of embodiment, provision is made that the connecting device is connected with the intermediate layer and if applicable with the flame-retardant layer in regions which are distributed over the surface of the connecting device and spaced apart from each other, whereby in a surprisingly simple manner a high-strength connection can be achieved between the intensely stressed connecting device and athe intermediate layer which is very capable of supporting a load and of tearing.

However, it is also possible that the connecting device is connected with the intermediate layer by means or threads and/or fibers for the mounting of the upholstery material, which threads and/or fibers penetrate the flame-retardant layer, whereby the flexibility of the flame-retardant layer and its full effectiveness under the action of flames is ensured, and nevertheless, also a division from high tractive forces, for example on separation of the upholstery materials from a connecting device formed by a burred tape is achieved.

In addition, in the use of threads and/or fibres, the cellular structure of the flame-retardant layer is not disadvantageously affected.

It is, in addition, advantageous, if the connecting device for the mounting of the upholstery material is connected with the intermediate layer by means of an adhesive layer penetrating through the flame-retardant layer, because thereby the cellular structure of the flame-retardant layer is only altered in the immediate connecting regions between the connecting device and intermediate layer, and in addition the adhesive layer can also be used at the same time in an advantageous manner for the fixing of the flame-retardant layer to the supporting body.

Moreover, it is advantageous if the connecting device is connected with the flame-retardant layer by means of an adhesive, in regions which are at a distance from the adhesive layers and from each other, because thereby the formation of folds or shearing forces which are too high can be avoided in the connecting regions with the intermediate layers.

It is, in addition, advantageous if the adhesive of the adhesive layer remains elastic after hardening, because thereby no disadvantage arises with regard to the comfort of the seat when the seat is being used.

However, it is also possible that the adhesive has a short hardening time, whereby the production of the seats constructed according to the invention is facilitated.

According the another variant embodiment, provision is made that in the region of adhesive layer and/or the threads, the flame-retardant layer is compacted ot a smaller thickness.

This construction has the advantage that the upholstery material also runs smoothly in the region of the connecting device, because the connecting device is arranged so as to be countersunk opposite the adjacent regions of the flame-retardant layer. In addition to this, after the assembly of an adhesive layer between the intermediate layer and the connecting device, a good contact can be achieved with the individual layers through the compacting of the flame-retardant layer, without the effect of the flame-retardant layer suffering thereby to any considerable extent.

It is, in addition, advantageous, if the adhesive for the adhesive layer is injected into the flame-retardant layer in the regions spaced apart from each other, because thereby the connection with the protective layer lying therebeneath is possible at any desired site on the flame-retardant layer, without the flame-retardant layer or respectively its cellular structure being destroyed to any considerable extent.

Provision is also made that the connecting device is formed by a burred tape or a supporting tape for a zip fastener, because connecting devices constructed in such a way are advantageously suited to the frequent mounting and detaching of upholstery materials.

It is, in addition, also possible that between the flame-retardant layer and the flame-resistant upholstery material a further layer of flame-resistant upholstery material is arranged in places, because thereby the stressing of the upholstery material in the region of supports for the seat or of bearing surfaces can be achieved.

Finally, it is also possible that the further layer of flame-resistant upholstery material is glued on the flame-retardant layer, whereby a secure and simple positioning of this further layer of flame-resistant upholstery material can be achieved simply.

The invention additionally comprises a process for the production of a seat, in particular for a vehicle, in which a supporting element is produced from a plastic provided in particular with flame-retardant, and is foamed onto an intermediate layer, such as a barrier film, which is connected with a flame-resistant upholstery material or with a flame-retardant or connecting layer, likewise consisting of plastic foam, and in which if applicable after the foaming of the supporting element of the flame-retardant or connecting layer, in the direction of the supporting element, in particular heated needles are pressed in through the upholstery material or the flame-retardant or connecting layer through the intermediate layer into the region of the supporting element facing the latter, and are then drawn out again.

This process is characterized in that through recesses arranged in the supporting body, the intermediate layer, which is formed, for example, by a barrier film, is removed at least over a portion of the cross-sectional region of the recess and if applicable a portion of the flame-retardant layer or connecting layer immediately adjacent to this intermediate layer is removed. Through this process, it is now possible in a surprisingly simple manner to adjust to a desired throughput of air, seats which are provided with a liquid- or humidity-repellent intermediate layer, after the final processing or respectively connection with the flame-retardant layer.

It is advantageous here if the intermediate layer, e.g. the barrier film, is melted away in the cross-sectional region of the recesses, because thereby a direct connection of the interior of the recesses with the air spaces in the flame-retardant layer can be produced with minimal expenditure.

According to another variant embodiment, it is possible that the intermediate layer, e.g. the barrier film, is nipped away or respectively milled off in the cross-sectional region of the recess, so that more solid barrier layers can be removed from the cross-sectional region of the recesses.

According to a further advantageous step, provision is made that the needles, distributed over the cross-sectional region of the recesses are pressed through the upholstery material and/or the intermediate layer and if applicable the barrier film, whereby the quantity of air penetrating through the flame-retardant layer or respectively the intermediate layer can also be varied.

Finally, it is also possible that the recesses are produced by a cutting or milling process after the foaming on of the supporting body onto the intermediate protective layer and extend into the region of the connecting- or flame-retardant layer or of the upholstery material, whereby it is possible to produce seats with differing amounts of air throughput with a uniformly constructed supporting body, because the number of recesses to enable a desired throughout of air can be produced after the completion of the supporting bodies.

For a better understanding of the invention, this is explained in further detail hereinafter by means of the example embodiments shown in the drawings.

Figure 1:
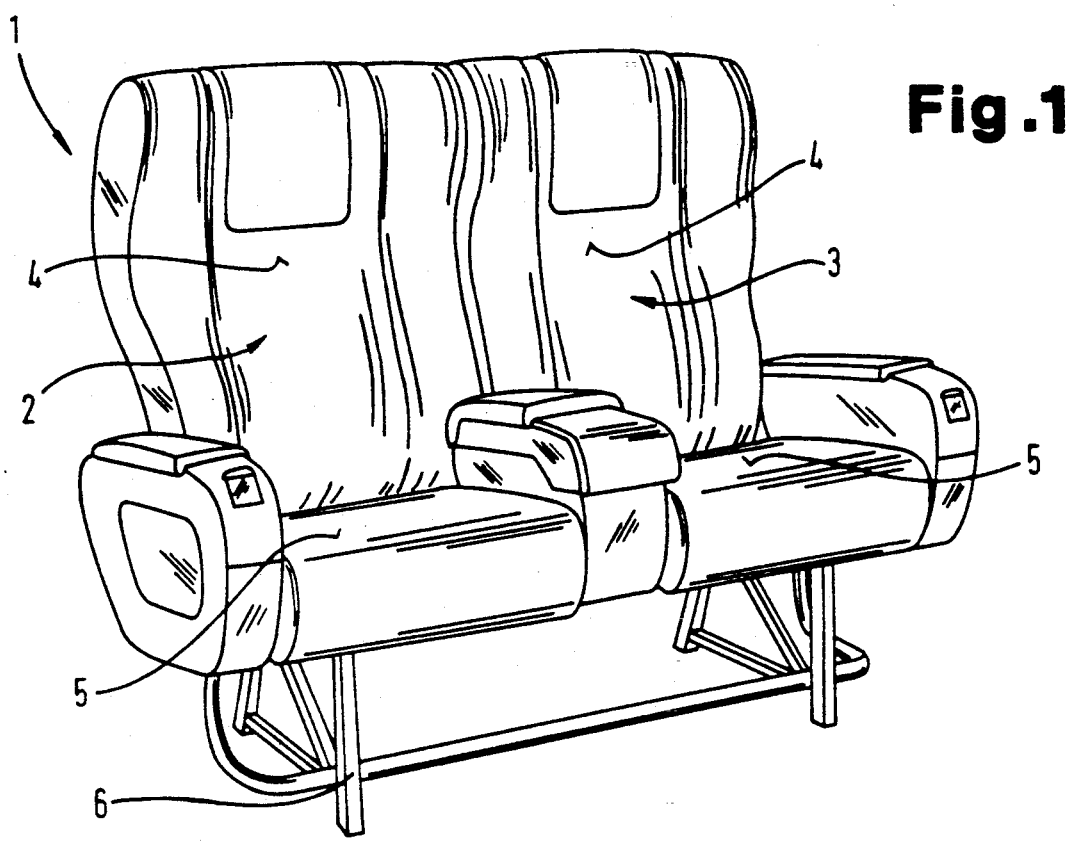
FIG. 1 shows a double bench seat with two seats according to the invention, for two people, in diagrammatic representation.

In FIG. 1, a double bench seat 1 with two seats 2, 3 is shown. Each seat 2, 3 consists of a padding 4 for a back rest and a padding 5 for a seat surface. The paddings 4 and 5 of the two seats 2 and 3 are identical in construction, but are built in mirror image. However, they can also be used for a single seat or for a multiple bench seat. In addition, a seat 2 or 3 can also consist of a single padding or several paddings.

The paddings 4 and 5 are placed into a support frame, designated generally by 6. The support frame 6 can also have any other desired shape.

Figure 2:
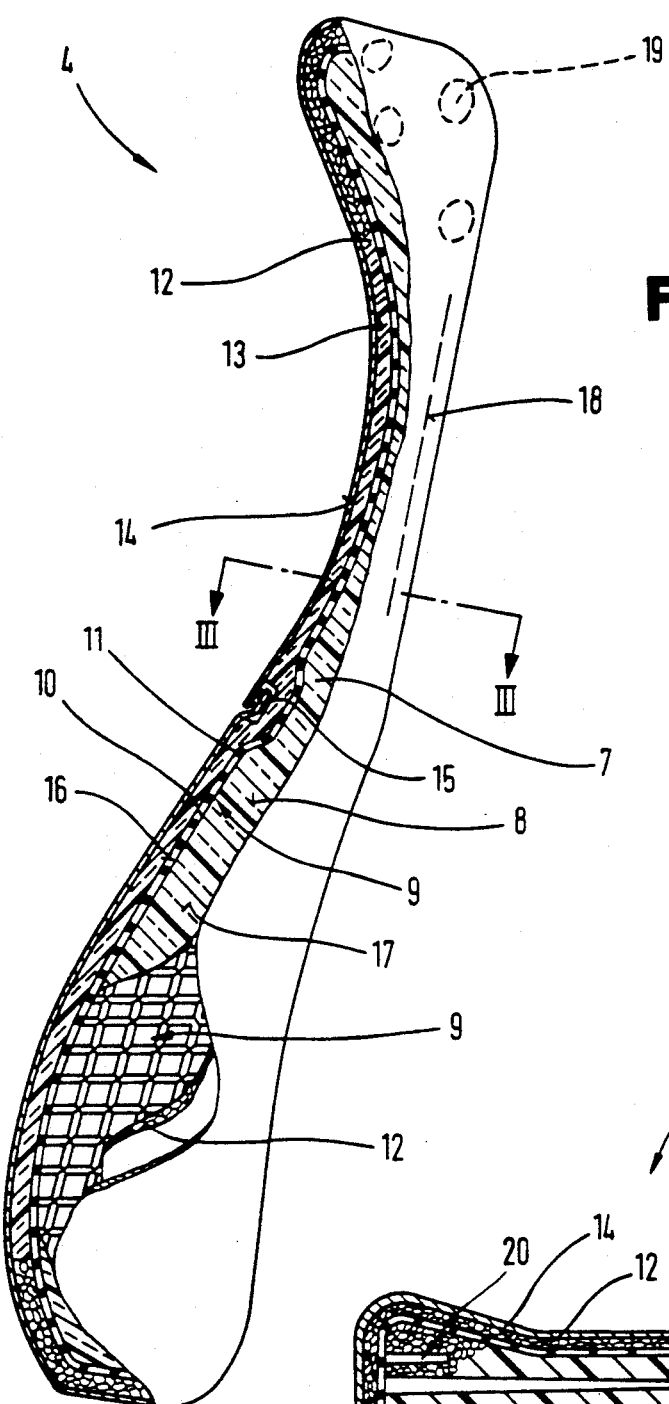
FIG. 2 shows a padding for a back rest of the seat according to FIG. 1 in side view.

In FIG. 2 a padding 4 is shown for the back rest, on an enlarged scale and partially in section, The padding 4 comprises a supporting body 7 which preferably consists of a shaped cold foam and is produced in a mould corresponding to the desired outer dimensions of the supporting body 7. it consists of an elastic open-cell plastic foram. Preferably, it is constructed in one piece. The plastic foam may be mixed with a pulverulent flame-retardant 8, e.g. melamine resin and/or aluminum hydroxide, as indicated diagrammatically by small dashes in the region of the hatching. On the upper face of the supporting body 7 an intermediate layer 9 of a lattice or respectively mesh of high temperature resistant threads 10 and 11 is arranged. This intermediate layer 9 is covered by a flame-retardant layer 12, which is provided on the side of the intermediate layer 9 facing away from the supporting body 7. This flame-retardant layer 12 is, as again indicated by dashes in the hatching, impregnated with a liquid flame retardant 13. The liquid flame retardant contains, for example, chlorine, bromine or phosphorus. It is advantageous if the liquid flame retardant is mixed with aluminium hydroxide, the grain size distribution of which is preferably between 0.2 and 110 μm. This flame retardant layer 12 preferably consists of a polyether, in which the foamed plastic forms a part of a plastic foam block, which is subsequently impregnated with a liquid flame retardant. The flame-retardant layer 12, the intermediate layer 9 and the supporting body 7 are connected with each other in regions distributed over the surface by means of an adhesive 19. The flame-retardant layer 12 is covered with a flame-resistant upholstery material 14 on each side facing away from the supporting body 7. The connection of the upholstery material 14 with the padding 4 takes place by means of burred tapes 15, which can be arranged in the region of a depression of the flame-retardant layer 12. The intermediate layer 9 and the flame-retardant layer 12 surround the supporting body 7 both in the region of an upper face 16 which faces the person using the seat, and also in the region of lateral faces 17 and a rear face 18. The flame-resistant upholstery material 14 may likewise cover the entire padding 4, but, owing to the construction of the padding 4 according to the invention, it is now also possible to omit the flame-resistant upholstery material in those regions which can not be seen—such as, for example, underneath the bench seat.

Figure 3:
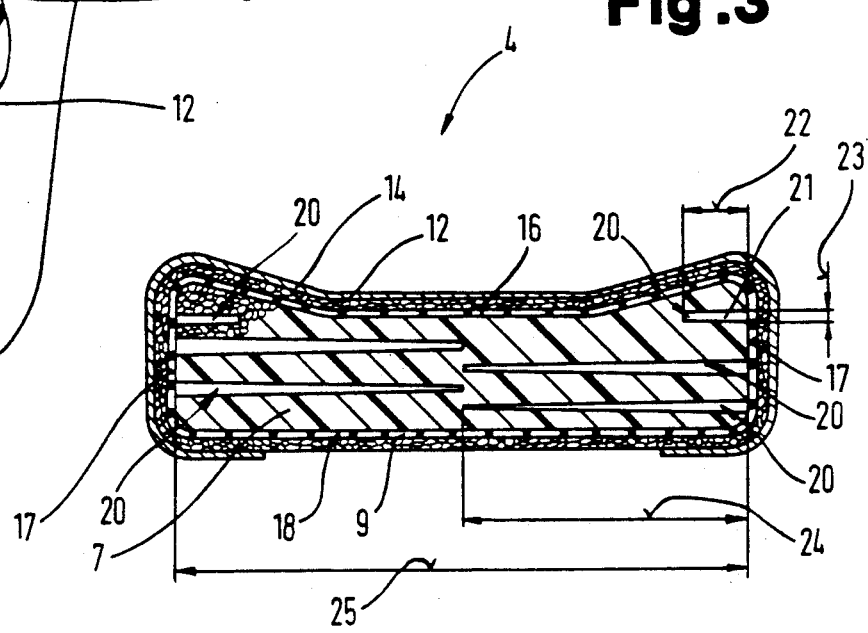
FIG. 3 shows the padding for the back rest according to FIG. 2 in plan view in section according to the lines III—III in FIG. 2.

In FIG. 3 a section through the padding 4 is shown, in which in addition to the known construction consisting of a flame-resistant upholstery material 14, a flame-retardant layer 12 arranged therebeneath, an intermediate layer 9 and the supporting body 7, recesses 20 are arranged. These recesses 20 extend in the present example embodiment from the two lateral faces 17 in the direction of the centre of the padding. The recesses 20 in the present example are formed by cylindrical truncated cones. However, the shape of the recesses 20 can be freely selected here. Thus, instead of the cylinder-shaped truncated cone, polygonal truncated pyramids or recesses with a cross-section in the shape of a truncated pyramid may be provided. It is essential here that, as can be seen from the drawing, openings 21 through the flame-retardant layer 12 and the intermediate layer 9 are covered. A length 22 and a diameter 23 in the region of the opening 21 can also be different, as can also be seen from the drawing. Through the different length, a ventilation can take place in the various regions distributed over the padding 4. In addition, in more intensely stressed regions, as in the padding 4 the central region, less recesses 20 or respectively recesses 20 with a smaller diameter 23 or respectively volume can be arranged. The length 22 of the recesses 20 will be less for example in the region facing the upper face 16 than a length 24 in the region of the rear face 18. In addition to this, the recesses 20 extend in each case only over a portion of a supporting body width 25. However, it is also possible here, instead of the recesses 20 shown in FIG. 4, to use recesses which extend over an entire supporting body width 25 from one lateral face 17 to the other lateral face 17.

Figure 4:
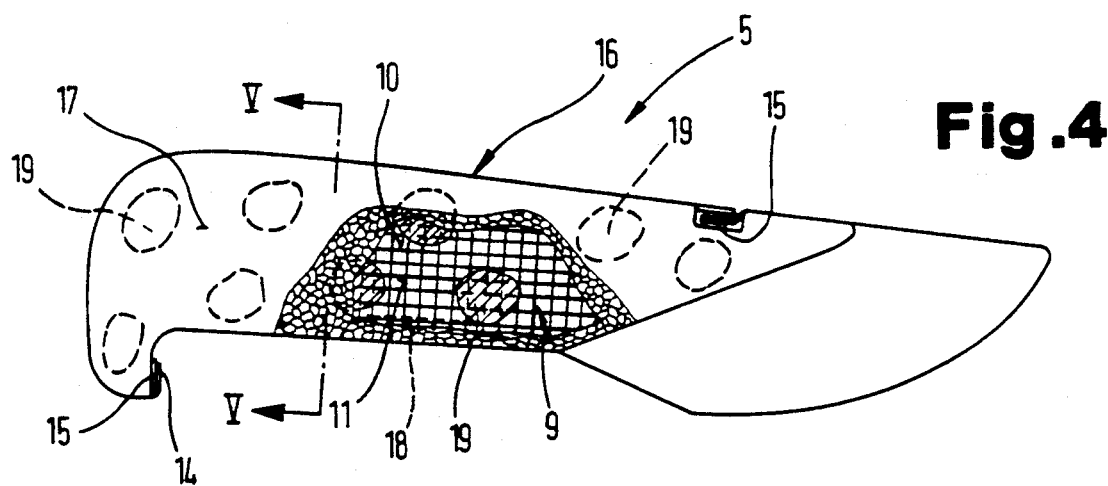
FIG. 4 shows a padding for a seat surface of the seat according to FIG. 1 in side view.

In FIG. 4 a padding 5 is shown, which forms a seat surface. In this padding 5, once again the intermediate layer 9 is associated with the upper face 16 facing the user, but also with the rear face 18 and the lateral faces 17, which intermediate layer is formed from a mesh, which consists of high temperature resistant materials such as, for example, threads 10 and 11 of glass, ceramic material of metal or respectively carbon. Moreover, in the region which is shown opened up, in which the individual layers of the padding 5 can be seen better, the regions can be seen which are spaced apart over the lateral face 17, in which by means of adhesive 19, the intermediate layer 9 is firmly glued to the supporting body 7 and the flame-retardant layer 12 to the intermediate layer 9. These regions, as indicated diagrammatically, are arranged distributed over the lateral faces 17 at a distance from each other, so that the throughput of air of the padding 5 is not substantially disadvantageously influenced by the adhesive 19. For the attachment of the upholstery material 14, a burred tape 15 is also arranged on the rear face of the padding 5 in this case.

Figure 5:
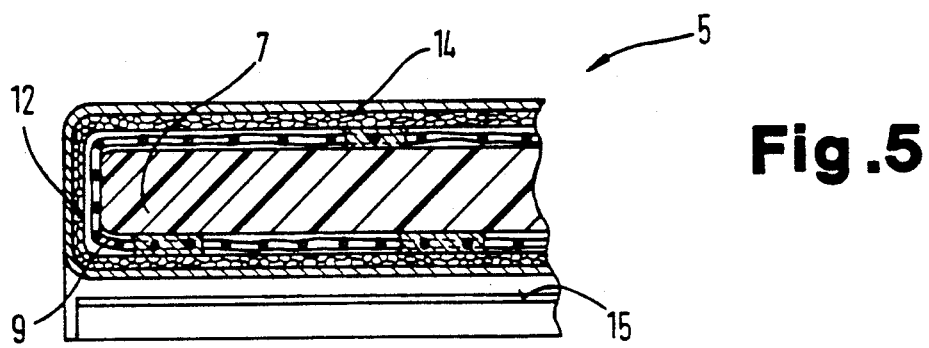
FIG. 5 shows the padding for the seat surface according to FIG. 4 in front view in section according to the lines V—V.

In FIG. 5 a section through the padding 5 is shown, from which once again the layered structure described above can be seen. In this case, also, there are arranged in front of the supporting body 7 an intermediate layer 9, which may also be formed for example by a knitted or woven material, in which the mesh width as in the case of the lattice or mesh of threads is approx. 0.5 to 8 mm, preferably 3 mm, a flame-retardant layer 12 and the flame-resistant upholstery material 14.

Figure 6:
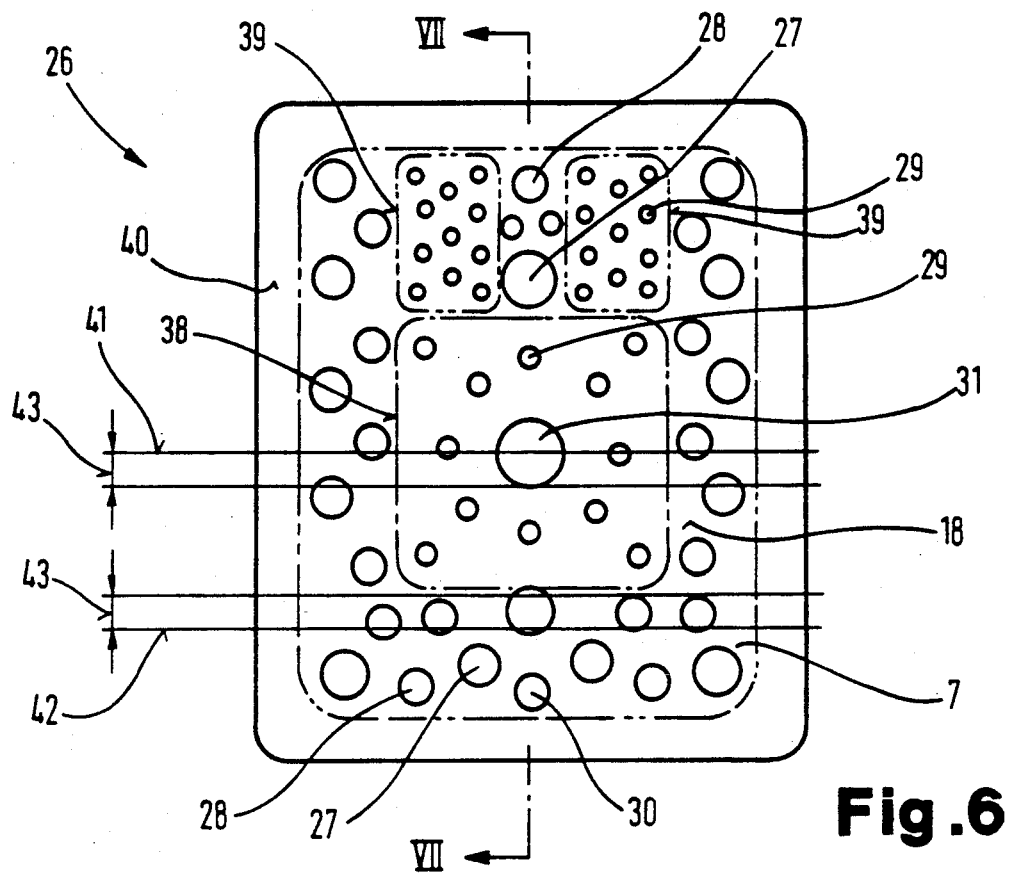
FIG. 6 shows a padding for a seat surface of a seat in a view from below, in which the flame-retardant layer is partially removed.
Figure 7:
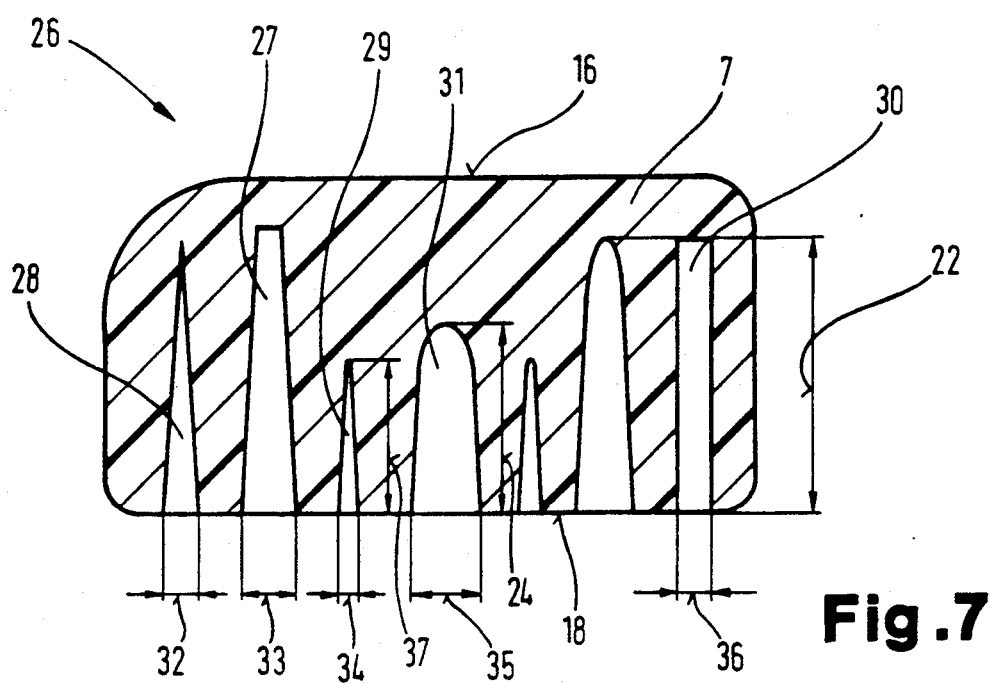
FIG. 7 shows the padding according to FIG. 6 in side view in section according to the lines VII—VII in FIG. 6.

In FIG. 6 and 7 a padding 26 is shown, the structure of which in the region of the upper face corresponds to that of the paddings 4 and 5. Moreover, in this padding 26, a plurality of recesses 27 to 31 are arranged. These recesses differ, as can be seen by looking at FIG. 6 and 7 together, merely through their cross-sectional shape or respectively diameters 32, 33, 34, 35 and 36 provided in the region of the rear face 18. Whilst, for example, the diameter 32 of the recess 28 is smaller than that of the recesses 27 and 31, this is constructed as a cone apex, whilst the recess 27 is constructed as a truncated cone. The recess 29 is in turn constructed as a cone apex, just as the recess 31, whereby, however, these have a parabolic cross-sectional shape. The recess 30, on the other hand, is constructed for example as a cylinder, the diameter 36 of which is of equal size over the entire length of the recess. Of course, however, it is also possible to use a triangular, hexagonal or polygonal block shape. Likewise, instead of the cylindrical truncated cones or respectively cone apices, polygonal pyramids or respectively pyramid points may appear.

Moreover, the recesses 27 to 31 have differing lengths 22 or respectively 24 or 37. Through the differing layer thicknesses between the ends of the recesses 27 to 31 and the upper face 16, a differing stability of the padding 26 is achieved in regions distributed over the upper face 16. Thus, in a region 38, enclosed by a dot-and-dash line, which region is arranged approximately in the position on the padding 26 on which the persons's bottom generally rests, a sufficient ventilation is provided through a plurality of recesses 29 and 31, which, however, have a small length 24 or respectively 37 and a small volume, whereby a stronger or respectively more rigid and resistant supporting layer is formed. Regions delimited by dash-and-two-dot lines 39 are associated for example with the upper thighs. There, also, a higher resistance to sitting through is achieved than for example in the immediately adjacent regions with the recesses 27 with the larger diameters. In fact, through a plurality of recesses 29, a good ventilation is achieved, but through their small diameter 34 these regions 39 of the padding 26 nevertheless display a higher resistance and a lower elasticity. In the regions adjacent to these regions 38 and 39, a plurality of recesses, partially with a larger diameter, is provided, so that these less stressed regions have a higher elasticity and a lower resistance, but on the other hand weight can be saved and consequently in the plastic foam used for the supporting body 7, one can work with a higher specific gravity, e.g., a greater filling of pulverulent flame retardants.

As can additionally be seen, the padding 26 has in its regions adjoining the upper face 16 or respectively the lateral faces 17 a continuous layer 40—delimitd by a two-dash-and-two-dot line—, in which no recesses at all area arranged. The thickness of this layer can be selected depending upon the service life prescribed by the testing authorities in the case of attack by flames. Usually, the layer has a thickness of approximately 5 to 100 mm.

For a better understanding of the differing specific gravities achieved by the invention, in cross-sectional slices 41, 42 running for example vertically to the upper face 16, these cross-sectional slices 41, 42 were drawn with thin lines in FIG. 6. The cross-sectional slices have an equal thickness 43. As can now be clearly seen from the representation in the drawing, in the region of the cross-sectional slice 42 substantially more recesses with a greater volume are provided than in the region of the cross-sectional slice 41, from which there results for these cross-sectional slices 41 with identical external dimensions as regards length and width, differing weights or respectively a differing ratio between recesses and plastic foam. Through the selection and arrangement of the recesses or respectively their volume, consequently also with a plastic foam with a higher specific gravity, which is naturally no longer so elastic as a plastic foam with a lower specific gravity, the elasticity behaviour of a plastic foam with a high specific gravity can be adapted to almost that with a lower specific gravity. This allows one to now find the tendancy to deform with a supporting body 7 consisting of one piece, for a padding 4, 5, 26 according to the invention, whereby the costly glueing processes for the connection of different layers into a padding 4, 5, 26 in one piece can be saved.

Generally, it is to be adhered to that for the flame-resistant upholstery material, mixtures are used between cotton and polyester. e.g. 81% cotton and 19% polyester, but also upholstery materials of 59% wool, 33% cotton and 8% polyester.

The plastic foam of which the supporting body 7 consists, can be formed by a cold shaped foam, which preferably has a specific gravity of between 15 and 60 kg/m$^3$, preferably 40 kg/m$^3$. This supporting body is, moreover, mixed with a pulverulent flame-retardant, which may consist of melamine resin and/or aluminium hydroxide or a mixture of the two.

The intermediate layer 9 is preferably formed from glass- or respectively carbon fibre mats, which may have a weight of 150 to 350 g/m$^3$. Thereby, a favourable behaviour is achieved between the increase in weight on using this intermediate layer 9 and its flame-retardant effect. However, intermediate layers 9 having a different weight may also be used.

Of course, the high temperature resistant threads or respectively fibres may be connected with each other in any manner. Thus, woven and knitted materials made from these fibres or threads or threads consisting of such fibres may be used and on the other hand the different materials may be used individually or mixed each other, in order to offer as high a resistance as possible, over a lengthy period of time, to the flames which act from the outside. Preferably, however, glass, ceramic material, graphite or high temperature resistant metals are used as basic materials for the threads and fibres.

Depending on the mesh width which is achieved in the knitted materials, woven materials, meshes or lattices of the high temperature resistant fibres or respectively threads, a so-called screen effect arises, which prevents the flame from passing out via this screen through the small openings and hereby the direct burning loss is reduced in the region of the supporting body 7 arranged behind the intermediate layer 9. On the other hand, a development of flames inside the supporting body can not transgress outwards from the interior onto other regions of the upholstery material, whereby the passage of air can not be increased in these regions for the flame in the supporting body, and hence the spreading of a fire in the seat is additionally reduced.

The flame-retardant layer 12 preferably consists of a foamed plastic with a specific gravity of approximately 20 to 60 kg/m$^3$. Usually, a polyether foam is used. Blocks are produced from this polyether foam and after the foaming-on, these are cut into sheets or strips with the desired layer thickness. These sheets are then impregnated with a liquid flame retardant, in which a polyurethane of the type 64 (of the firm Bayer) may be used as flame retardant, parts by weight of which are mixed with 80 parts by weight Al (OH)3. This aluminium hydroxide is stirred into the polyurethane.

Figure 8:
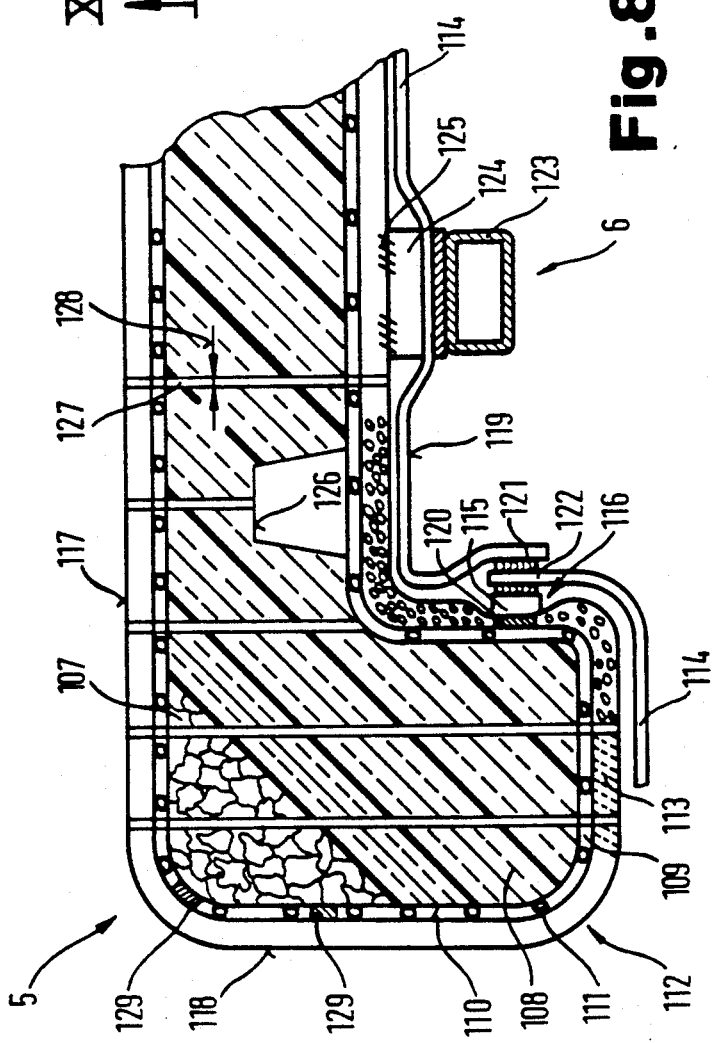
FIG. 8 shows a padding for a seat surface of the seat according to FIG. 1 in side view in section.

In FIG. 8 a double bench seat is shown on an enlarged scale and in section, which may substantially correspond to the double bench seat 1 shown in FIG. 1—for which reason the same reference numbers are also used for some of the parts—with two seats with a padding for the back rest and a padding 5 for a seat surface of the paddings 5 for the seat surface. The padding 5 comprises a supporting body 107 which preferably consists of a cold shaped foam and is produced in a mould corresponding to the desired external dimensions of the supporting body 107. It consists of an elastic open cell plastic foam. Preferably, it is constructed in one piece. The plastic foam can be mixed with a pulverulent flame retardant 8, e.g. melamine resin and/or aluminum hydroxide, as indicated diagrammatically by small dashes in the region of the hatching. On the upper side of the supporting body 107 an intermediate layer 109 of a lattice or mesh of high temperature resistant threads 110 and 111 is arranged. This intermediate layer 109 is covered by a flame retardant layer 112, which is provided on the side of the intermediate layer 109 facing away from the supporting body 107. This flame retardant layer 112, as again indicated by dashes in the hatching, is impregnated with a liquid flame retardant 113. The liquid flame retardant 113 contains, for example, chlorine, bromine or phosphorus. It is advantageous if the liquid flame retardant is mixed with aluminium hydroxide, the grain size distribution of which is preferably between 0.2 and 110 μm. This flame-retardant layer 112 preferably consists of a polyether, in which the foamed plastic forms a part of a block of plastic foam, which is subsequently impregnated with a liquid flame retardant 113. The flame-retardant layer 112 is covered on each side facing away from the supporting body 107 with a flame-resistant upholstery material 114. The connection of the upholstery material 114 with the padding 5 takes place by means of a connecting device 115, e.g. burred tapes, which may be arranged in the region of a depression 116 of the flame-retardant layer 112. The intermediate layer 109 and the flame-retardant layer 112 surrounded the supporting body 107 both in the region of an upper face 117, which faces the person using the seat, and also in the region of lateral faces 118 and a rear face 119. The flame-resistant upholstery material 114 may likewise cover the entire padding 5, but, owing to the construction of the padding 5 according to the invention, it is now also possible to omit the flame-resistant upholstery material 114 in those regions which can not be seen—such as, for example, underneath the bench seat.

As can be seen additionally in FIG. 8, the connecting device 115 is connected with the intermediate layer 109 with regard to movement. This takes place, as indicated diagrammatically for example in FIG. 8, by means of an adhesive layer penetrating the flame-retardant layer 112. This adhesive layer 120 represents a connection with regard to movement between the connecting device 115 and the intermediate layer 109.

As can be seen better from this illustration, the connecting device 115, which in the present case may be constructed as a burred tape, is connected with the upholstery material 114, in which a further end 121 of the upholstery material 114 may be connected by means of a further burred tape with the other end 122 of the upholstery material. Of course, instead of the burred tapes shown, supporting tapes connected with zip fasteners, or the like, may be used.

As can be seen in addition from this illustration, a further layer 124 of a non-flammable upholstery material 114 may be arranged for example in regions of supporting spars 123 of the supporting frame 6. This further layer 124 of the non-flammable upholstery material 114 may be connected by means of an adhesive 125 with the flame-retardant layer 112. Thereby, the upholstery material arranged between the supporting spar 123 and the flame-retardant layer 112 is protected, because the very flexible flame-retardant layer 112 is strengthened and stiffened by the further layer 124 of the upholstery material, so that intensive crinkling in the region of the supporting spar 123 can be avoided. This means that in the corner regions of the supporting spar, the upholstery material 114 is no longer worn so intensively as without the use of a further layer 124 of the upholstery material. The use of a mesh or a knitted material of highly resistant fibres, such as, for example glass fibres or the like, would not bring the same success as the use of an upholstery material 114, because these materials are, in themselves, very rigid and brittle, so that the danger exists that the upholstery material 114 between the supporting spar 123 and such a reinforcement insert consisting of meshes or knitted materials of glass fibres or the like, would be even more greatly stressed than previously.

To achieve a sufficient permeability to air in the region of the padding 5, recesses 126 may be provided therein.

It is, in addition, also possible to arrange tubular openings 127 with a diameter 128, which may preferably be from 0.1 to 20, preferably 1 mm. These openings 127 may penetrate the entire thickness of the padding 5 or the region between the upper face 117 and the recess 126. Thereby, a sufficient breathing activity of the padding 5 is ensured.

The flame-retardant layer 112, the intermediate layer 109, and the supporting body 107 are connected with each other in regions distributed over the surface, by means of an adhesive 129.

Figure 9:
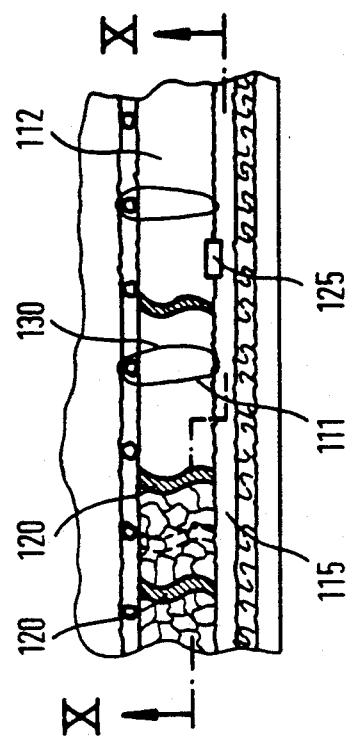
FIG. 9 shows the connecting site between the intermediate layer and the connecting device on an enlarged scale.

In FIG. 9 it can be seen better that the adhesive layer 120 between the connecting device 115 and the intermediate layer 109 are arranged locally and spatially at a distance from each other, so that the entire elasticity of the flame-retardant layer does not suffer substantially thereby. It is, also shown that instead of the adhesive layer 120 the connection between the connecting device 115 and the intermediate layer 109 can takes place by threads 130, which embrace for example the threads 111 of the intermediate layer 109 and penetrate the connecting device 115. Of course, it is possible in addition between these threads 130, as likewise indicated diagrammatically, to connect the intermediate layer 109 and the connecting device 115 with each other by means of the adhesive 125.

In addition, it is also possible, in regions staggered with respect to these latter, to connect the connecting device 115 with the flame-retardant layer 112 by means of an adhesive 125. The type of connection between the connecting device 115, the flame-retardant layer 112 and the intermediate layer 109 can be divided according to stress, and can either take place only through the adhesive layer 120 or only thorugh threads 130 or the adhesive 125 or in a selective combination.

Figure 10:
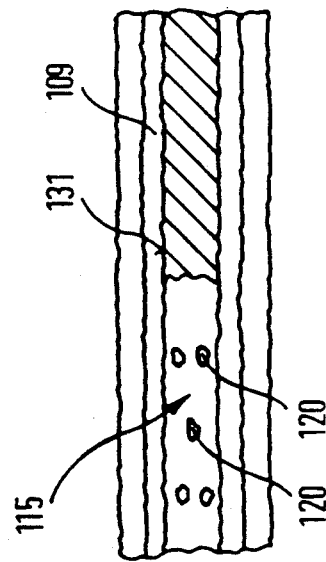
FIG. 10 shows the padding for the seat surface in front view and in section according to the lines X—X in FIG. 9.

In FIG. 10 it can, in addition, be seen that the tape-shaped connection device 115, which is formed as a burred tape 131, is, as can be seen, connected with the intermediate layer 109 in several regions which are at a distance from each other. For the dosaged introduction of the adhesive for the production of these adhesive layers 120, the adhesive can be injected into the flame-retardant layer 112, whereby the connection between the connecting device 115 and the intermediate layer 109 can take place by exerting a pressure force. Thereby it is possible to press the connecting device 115 or respectively the burred tape 131 so deeply into the flame-retardant layer 112, as shown in FIG. 8, that the upholstery material 114 can be removed almost flat over the connecting device 115 and the immediately adjacent regions of the flame-retardant layer 112.

Of course, the recesses 126, one of which is shown diagrammatically in FIG. 8, may have differing configurations, thus, for example, that of a cylindrical truncated cone. Instead of the cylindrical truncated cone, however, polygonal truncated pyramide or recesses with a cross-section in the shape of a truncated pyramid may be provided. It is essential here that, as can be seen from the drawing, openings through the flame-retardant layer 112 and the intermediate layer 109 are covered. A length and a diameter in the region of the opening may be different. Through the differing length, in the various regions distributed over the padding 5, a ventilation of differing intensity may take place. In addition, in more intensely stressed regions, such as in the padding 5 in the central region, less recesses may be arranged, or respectively recesses with a smaller diameter or respectively volume.

The intermediate layer 109 may be formed by a knitted material, a mesh, a lattice or the like, which consists of high temperature resistant materials such as, for example, threads 110 and 111 of glass, ceramic material or metal or respectively carbon. Moreover, in the region which is represented in opened up form, in which the individual layers of the padding 5 can be seen better, the regions can be seen which are at a distance over the side faces, in which the intermediate layer 109 is securely glued by the adhesive 125 on the supporting body 107 and the flame-retardant layer 112 on the intermediate layer 109. These regions are, as indicated diagrammatically, arranged distributed over the lateral faces at a distance from each other, so that the throughput of air of the padding 5 is not disadvantageously affected by the adhesive 125 to a substantial extent.

The intermediate layer 109 may also be formed, for example, by a knitted material or a woven material, in which preferably the mesh width, as in the case of the lattice or mesh of threads, is approximately 0.5 to 8 mm, preferably 3 mm.

Generally, it is, in addition, to be adhered to that for the flame-resistant upholstery material, combinations may be used between cotton and polyester, e.g. 81% cotton and 19% polyester, but also upholstery material of 59% wool, 33% cotton and 8% polyester may be used.

The plastic foam of which the supporting body 107 consists may be formed by a cold shaped foam, which preferably has a specific gravity between 15 and 60 kg/m$^3$, preferably 40 kg/m$^3$. This supporting body is, furthermore, mixed with a pulverulent flame retardant, which may consist of melamine resin and/or aluminium hydroxide or a mixture of the two.

The intermediate layer 109 is preferably formed from glass-or respectively carbon fibre mats, which may have a weight of 150 to 350 g/m$^3$. Thereby a favourable behaviour is achieved between the increase in weight on using this intermediate layer 109 and its flame-retardant effect. However, intermediate layers 109 with a different weight may also be used.

Of course, the high temperature resistant threads or respectively fibres may be connected with each other in any desired manner. Thus, woven materials and knitted materials from these fibres or threads or threads consisting of such fibres may be used, and, on the other hand, the most varied of materials may be used individually or mixed with each other, in order to offer as high a resistance as possible to the flames which attack from the outside, over a lengthy period of time. Preferably, however, glass, ceramic material, graphite or high temperature resistant metals are used as base materials for the threads and fibres.

Depending on the mesh width which is achieved in the knitted materials, woven materials, meshes or lattices of the high temperature resistant fibres or respectively threads, a so-called screen effect arises, which prevents the flame from emerging beyond this screen through the small openings, and thereby the direct burning loss is reduced in the region of the supporting body 107 arranged behind the intermediate layer 109. On the other hand, the development of flames inside the supporting body can not transgress from the interior outwards to other regions of the upholstery material, whereby the entry of air in these regions can not be increased for the flame in the supporting body, and hence the spreading of a fire in the seat is additionally reduced.

The flame-retardant layer 112 preferably consists of a foamed plastic with a specific gravity of approximately 20 to 60 kg/m$^2$. Generally, a polyether foam is used. From this polyether foam, blocks are produced and after the foaming-on, these are cut into sheets or strips with the desired layer thickness. These sheets are then impregnated with a liquid flame retardant, wherein a polyurethane of the type 64 (of the firm Bayer) may be used as flame retardant, parts by weight of which are mixed with 30 parts by weight Al (OH)$^3$. This aluminium hydroxide is stirred into the polyurethane.

Of course, the connecting devices, as described above in connection with the padding 5, are also able to be used in connection with the paddings 4 according to FIG. 1.

Figure 11:
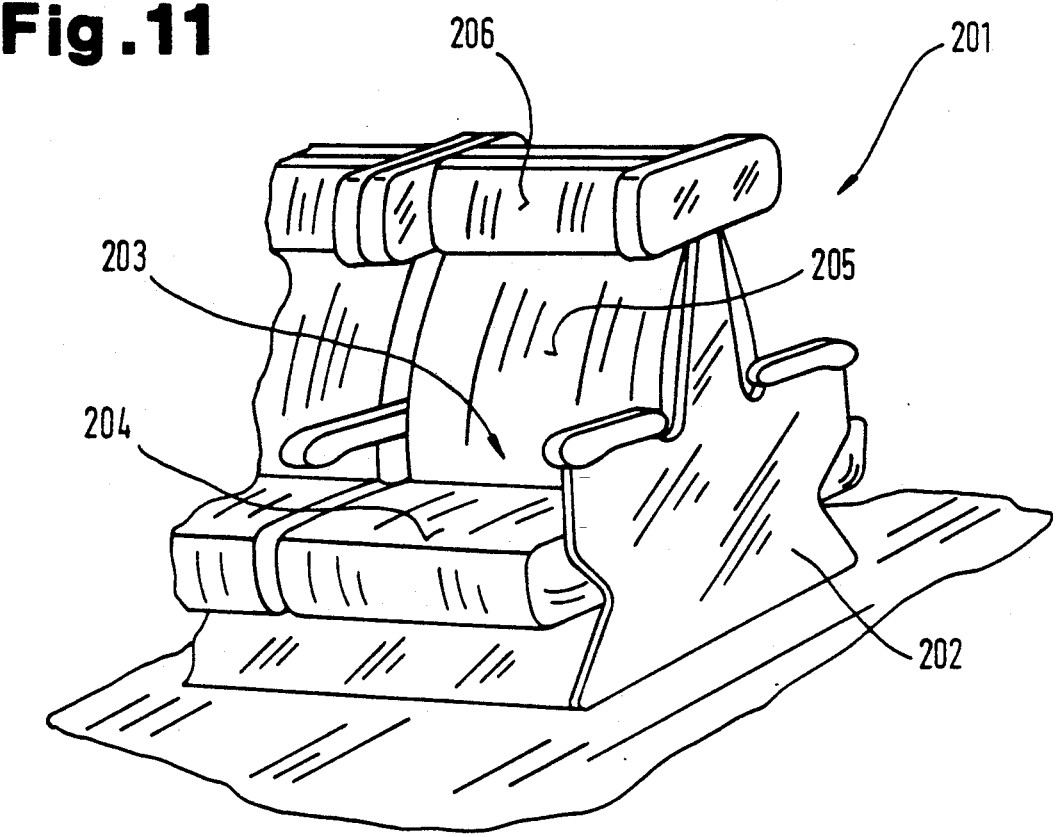
FIG. 11 shows a double bench seat with two seats according to the invention, for two people, in diagrammatic representation.

In FIG. 11, a seat 201 for a vehicle is shown, for example for public transport, such as a tram, a railway carriage or a bus. The seat 201 may, however, likewise be used in a different form for passenger cars or lorries. This seat 201 consists of a supporting frame 202, and a padding 203 produced from several layers, which padding, as in the example embodiment shown, may comprise a seat padding 204, a back padding 205 and a seat padding 206. Each of these seat paddings, back paddings and heat paddings 204, 205 or respectively 206 may consist of several layers.

Figure 12:
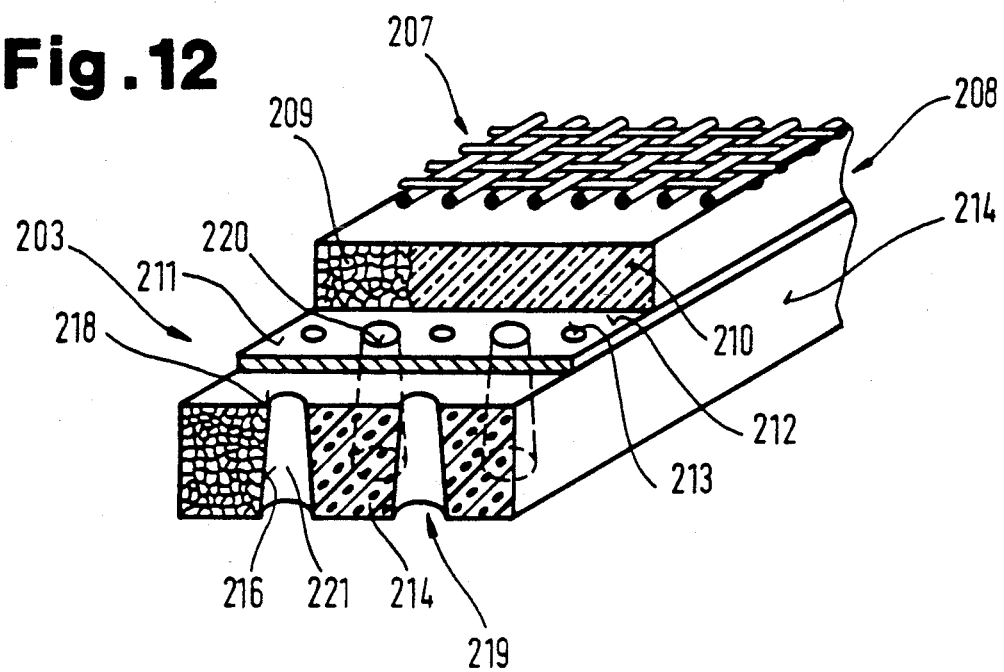
FIG 12 shows a seat padding for a seat according to FIG. 11 in a diagrammatic representation, partially in section.

In FIG. 12 the layers of which the seat, back and head paddings 204 to 206 may consist, are shown on an enlarged scale. The uppermost layer of the padding 203 may, if necessary, be formed by a non-flammable upholstery material 207, which is shown diagrammatically as a knitted material. The type of production or respectively structure of the upholstery material which is used is not linked to the form of embodiment shown, and is able to be selected as desired. Preferably, such an upholstery material consists, however, of 59% wool, 33% cotton and 8% polyester. However, it is also posssible to use upholstery materials of 81% cotton and 19% polyester. Such non-flammable or respectively flame repellent upholstery materials are known from the prior art and any desired upholstery materials coming into question here, also upholstery materials which are not non-flammable may be used.

Beneath the upholstery material 207, if required, a flame-retardant layer 208 may be arranged, which may be formed from a plastic foam, in particular a polyether foam material 209. The raw material of this polyether foam 209 may, if necessary, be additionally mixed with a liquid flame retardant 210, which is indicated in the drawing diagrammatically by dashed lines.

However, it is also possible that the upholstery material is placed onto an intermediate layer 211 of a PE- or PU-film without a flame-retardant layer, e.g. directly or via a thin connecting layer, e.g. a polyether- or polyester foam layer which already softens at approximately 80° C. and is able to be used as an adhesive layer, or another plastic foam.

The connecting- or flame-retardant layer 208 is arranged between the upholstery material 207 and the intermediate layer 211, which is formed by a humidity-tight barrier film 212, e.g. a PE- or respectively PU-film. A thickness of this film is represented in overproportional enlargement for a better understanding, likewise pore-like openings 213 arranged therein if necessary. Through these pore-like openings 213, a "breathing" is to be achieved through the barrier film 212. Thereby, favourable properties of the seat are to be achieved and the formation of sweat is to be prevented when the padding is used by a person. On the other hand, however, through the fluid-tight barrier film 212 it is to be achieved that before the foaming-on of a supporting body lying therebeneath, consisting of plastic foam, the liquid plastic does not enter into the compound-or respectively flame-retardant layer 208 and harden there.

The supporting body 214, which is formed, for example, from a cold shaped plastic foam, preferably has a specific gravity of 40 to 80 kg/m.

In addition, if necessary, it is also possible to mix the plastic foam with 20 to 50 parts by weight, preferably with 35 parts by weight pulverulent flame retardant 215, which is represented diagrammatically by small rings in the sectional plane of the supporting body 214. The flame retardant 215 consists of a powder of melamine resin and/or aluminium hydroxide and/or ammonium polyphosphate.

The supporting body 214 is preferably foamed on directly onto the barrier film 212, whereby a fixed composite is produced between the latter and the supporting body 214.

From the illustration in FIG. 12 it can, in addition, be seen that recesses 216 are arranged in the supporting body 214. These recesses 216 penetrate the supporting body 214 and run approximately parallel to a load direction characterized by an arrow 217. The recesses 216 are constructed in the present example embodiment as cylindrical truncated cones, in which a smaller cross-sectional face 218 faces the intermediate layer 211, whilst a larger cross-sectional face 219 faces the opposite surface of the supporting body 214. Approximately in congruence with the cross-sectional face 218 of the recess 216, an opening 220 is arranged in the intermediate layer 211. Through this, the caverns or respectively open cells in the connecting-or respectively flame-retardant layer 208 or in the upholstery material 207 are directly connected with an interior 221 of the recesses 216.

Figure 13:
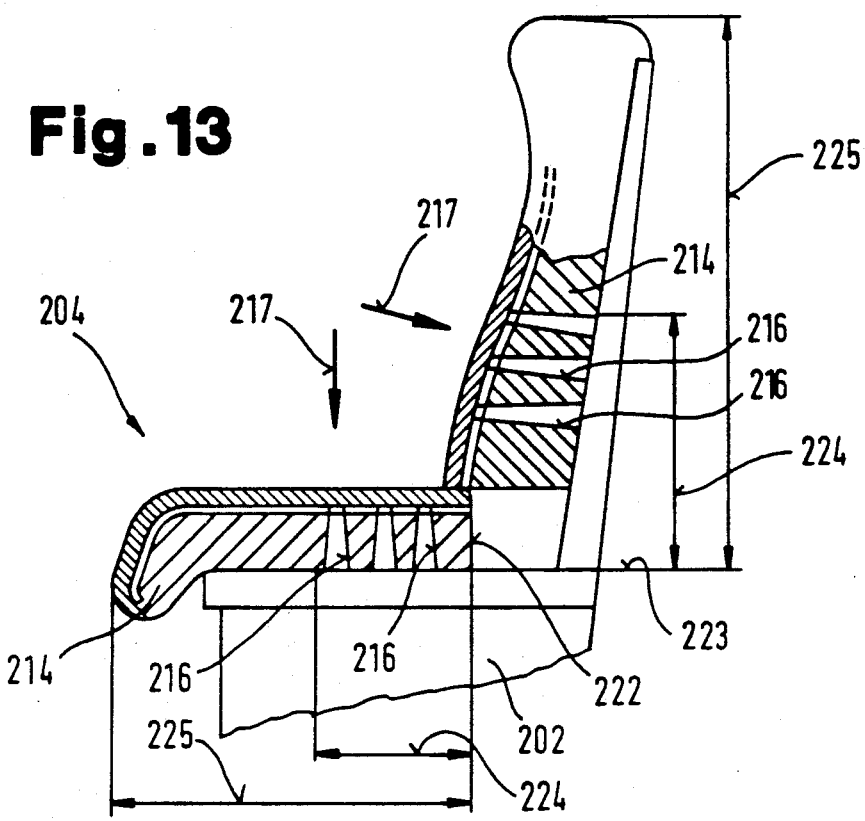
FIG. 13 shows a portion of the double bench seat according to FIG. 11 in side view, in section.

As shown in FIG. 13, the recesses 216 run both in the seat padding 204 and also in the back padding 205 approximately parallel to the load direction indicated in each case by the arrow 217. As can be seen in addition from this illustration, in which the seat padding 204 and the back padding 205 are shown in their installed position on the supporting frame 202, the recesses 216 extend from the ends 222, 223 of the seat padding 204 which face each other, and of the back padding 205 in the direction of the ends which are at a distance from each other, in each case only over a length 224 of the seat padding 204 or respectively of the back padding 205. The length 224 here is between 25 and 50% of a total length 225 of the seat padding 204 or respectively of the back padding 205.

Preferably, apart from in the regions delimited by the length 224, otherwise no recesses 216 are arranged in the supporting bodies 214. Of course, however, it is also possible to arrange recesses 216 in the other regions of the seat padding 204 or respectively back padding 205, in which, however, the number thereof or respectively the cross-sectional area thereof may be considerably less than in this region. If one proceeds accordingly, even if a plurality of recesses is arranged over the length 224 for a better ventilation of the very intensely stressed regions of the seat 201, in fact a sufficient lateral stability of the seat— or respectively back padding 204, 205 can be achieved.

Figure 14:
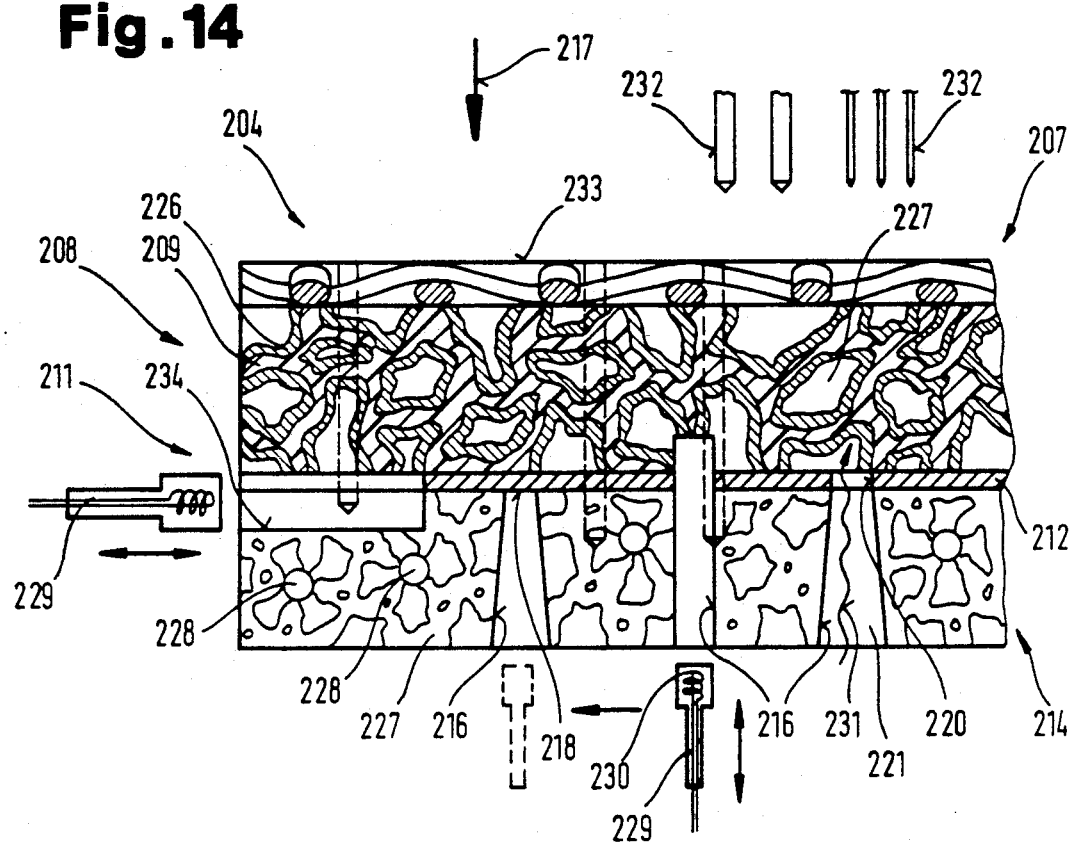
FIG. 14 shows a seat padding according to FIG. 11 or 12 in simplified diagrammatic representation and in side view in section.

In FIG. 14, by means of a section through the seat padding 204 it is shown, in addition, that the connecting- or respectively flame-retardant layer 208 arranged between the upholstery material 207 and the intermediate layer 211, may consist of a plastic foam with predominantly open cells—i.e. a sponge-like plastic and therefore a soft foam. In order to improve the flame-retardant behaviour of this plastic, arranged immediately under the upholstery material 207, if necessary accordingly, the flame-retardant layer 208, which preferably consists of polyether foam 209 with a specific gravity of 15 to 35 kg/m³ and has a thickness of 3 to 8 mm, may be impregnated with a liquid flame retardant 226. In order to be able to explain the effect of this flame retardant better in the region of the sectional plane the open cell structure, which can best be compared with a three-dimensional framework, was illustrated diagrammatically. Through the impregnation, this cell structure, i.e. the cross-pieces forming the spatial framework, is covered on all sides with the flame retardant 226. Thereby, the fire behaviour is already improved in the first phase of an attack by flames. In addition to this is the fact that, even in the case of a destruction of this protective layer, consisting of flame retardants 226 also in the plastic forming the cell structure, as already explained in FIG. 12, a liquid flame retardant is mixed in, which is already contained in the foamed-on material. Through the combination of these two flame retardants, it is achieved that not only the fire behaviour, but rather especially the development of smoke and the density of fumes in the development of flames can be specifically controlled.

The supporting body 214 also consists of a plastic, which predominantly has open cells 227. Also in such a plastic material which is provided with predominantly open cells 227, individual closed cells 228 are provided at intervals.

This plastic material may be additionally mixed with solid flame retardants 215 which are mixed into the raw material before foaming, in order to influence the fire behaviour and formation of fumes in an applicable manner. The plastic of the supporting body 214, however, is not adjusted so as to be softly elastic, but rather so as to be hard.

In addition to this is the fact that through the admixture of these pulverulent flame retardants, the dripping behaviour of the plastic foam during the attack by flames can be influenced such that it does not drip when burning, and consequently a secondary ignition of materials or matter arranged underneath the seat is reliably prevented.

A further important and advantageous property of this combination of materials lies in that polyether foam of the flame-retardant layer 208 for the upholstery material 207, which in itself is flame-resistant, can not exert a wick effect, i.e. can not lead again and again to consecutive ignitions, because owing to the impregnation of the flame-retardant layer 208 with the liquid flame retardant 226, it is not possible for the flames to be passed on.

A raw material mixture for the production of a plastic foam for the flame-retardant layer 208 may consist, for example, of 100 parts by weight standard polyol, 43 parts by weight TDI 8020, 11 parts by weight TDI 6535 (for example of the firm Bayer), 0.12 parts by weight tertiary amines, 1.20 parts by weight stabilizers, 0.4 parts by weight 10/2 octate and 8 parts by weight liquid flame retardant. Such a plastic foam is preferably produced as a block and after the foaming-on is cut into sheets or strips with the desired layer thickness, in which a thickness of from 3 to 8 mm comes into consideration as the layer thickness for the flame-retardant layer.

The sheets for the flame-retardant layer 208 have a thickness of 3 to 8 mm. The sheets for the connecting layer are approximately 1-3 mm thick. The flame-retardant layer 208 may also be impregnated with liquid flame retardant, in which after the impregnation of the sheets, these run through crushing cylinders, in order to obtain a uniform distribution of the liquid flame retardant 226 over the surface of the cell structure.

If the connecting- or respectively flame-retardant layer 208 forms a sandwich element in one piece with the supporting body 214, then between the latter a continuous humidity-tight intermediate layer 211 is necessary, such as, for example the barrier film 212 which is shown. In this case, in fact, the connecting- or respectively flame-retardant layer 208 is placed into the mould with or without the upholstery material 207 and the intermediate layer 211, formed by a continuous watertight barrier film 212, which are connected with each other or are laminated onto each other.

The supporting body 214 is foamed onto this intermediate layer 211, which faces the cavity of the mould. In order to now make possible a sufficient throughput of air through the seat padding 204 in the direction of load—arrow 217—, or respectively to ensure that this occurs, recesses 216 are moulded in the production of the supporting body 214. These recesses, as indicated diagrammatically, may be truncated cones or truncated pyramids, or cylinders. The water-tight barrier film 212 is therefore necessary, in order to prevent, in the foaming-on the supporting body, the plastic foam from penetrating in the liquid phase into the open cells of the flame-retardant layer 208 and reacting in these open cells, whereby the damping behaviour and, in addition, also the resistance to an attack by flames would be disadvantageously altered. In order, however, to now maintain a sufficient throughput of air of for example 30 litres per minute at atmospheric pressure, and to ensure the corresponding elasticity of the flame-retardant layer 208, and to avoid the formation of sweat when sitting on the seat padding 204, the interiors 221 of the recesses 216 are connected with the open cells 227 or respectively the caverns which are composed from these cells, in the connecting- or respectively flame-retardant layer 208 or respectively the upholstery material 207. This takes place for example, as illustrated in a very simplified and diagrammatic manner, and for a better understanding of the invention partially also greatly distorted in terms of size, in that heating rods 229, into which for example an electric heating filament 230 is incorporated, are introduced into the recesses 216. Through the action of heat, at least one opening 220 is burned into the intermediate layer 211, or respectively the plastic material of the intermediate layer 211 is melted away. Thereby, a direct passage of external air 231 into the cells 227 or respectively the upholstery material 207 is achieved, and the breathing behaviour or respectively the sitting climate of the seat padding 204 is considerably improved. As shown in the present example embodiment, a cross-section of the opening 220 corresponds substantially to the cross-section of the cross-sectional face 218 of the recesses 216 facing the intermediate layer 221. However, it is likewise possible that the openings 220 in the intermediate layer 212 are smaller than the cross-sectional face 218 of the recesses 216. In order to make possible a good permeability to air in any case also through the connecting- or respectively flame-retardant layer 208, the seat padding 204 can be needled after the foaming-on of the supporting body 214, i.e. needles 232, illustrated diagrammatically in FIG. 14, which may be heated and have a diameter of 0.5 to 5 mm and preferably heated to a temperature of 120 degrees C. to 160 degrees C., are pushed in the direction of load—arrow 217—through the upholstery material 207 and the flame-retardant layer 208 and also the intermediate layer 211, preferably into the supporting body 214, as indicated diagrammatically in FIG. 14 by dashed lines. Amongst other possibilities, it is also possible that several thin needles 232 are used, which are positioned such that they penetrate the flame-retardant layer 208 in each case in the region of the openings 220. Thereby, a straight-lined movement of air is to be produced, with as little resistance as possible between a seat surface 233 of the seat padding and an underside thereof.

Moreover, it has, however, been found that a removal of air and a ventilation of the seat surface 233 can be improved especially when recesses 234 are also arranged in the supporting body 214, running parallel to the seat surface 233. These may extend for example from the lateral faces of the seat paddings or respectively back paddings into the middle region thereof. Since such openings only have a width corresponding to the diameter or respectively opening cross-section in the direction of load—arrow 217—which is generally less than the thickness of the supporting body 214, the recess 234 under load can be compressed to a substantially smaller cross-section than the normal cross-section, whereby the air contained therein can be pressed outwards via the lateral faces.

Through the use of a heating rod 229, it is also possible here, at any rate over the longitudinal path of the recess 234, to remove the intermediate layer 211 for example by melting away or the like. Of course, however, it is also possible, instead of the heating rods 229, to use corresponding rotating tools, such as millers or nipping tools, with which the intermediate layer 211 can be removed in the region of the recesses 216 or respectively 234.

Within the framework of the invention, however, it is also possible that the seat paddings 204 or respectively back paddings 205 may be provided with recesses 216 or respectively 234 in the direction of their overall length. Especially if such recesses 234 are provided, running parallel to the overall length 225, it proves to be advantageous if these open out on the end face facing the back padding 205, in which it is then advantageous if the back padidng 205 rests on the seat padding 204. Then the air which is displaced through the movements on the seat can flow out to the rear unhindered, through the recesses 234, whereas in the opposite direction it may be prevented from flowing out by the lower thighs or bags or the like placed under the seat.

Figure 15:
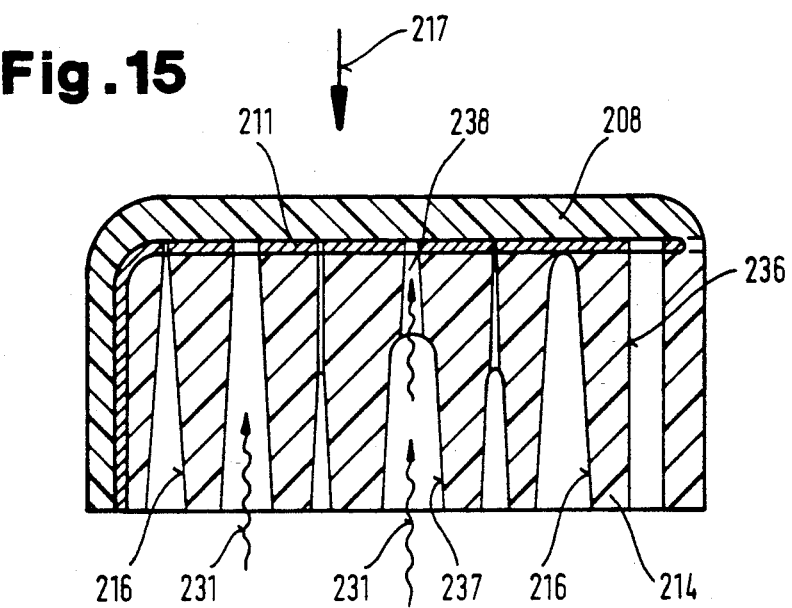
FIG. 15 shows another variant embodiment of a seat padding in side view in section and in simplified diagrammatic representation with differently constructed recesses.

In FIG. 15, a seat padding 235 is shown in simplified diagrammatic representation, in which a flame-retardant layer 208 is connected via an intermediate layer 211 with a supporting body 214 into a sandwich element. In order to now achieve a sufficient ventilation with external air 231—indicated diagrammatically by wavy arrows—it is shown that the recess 216 may have differing cross-sectional shapes. Thus, it is possible that, as shown by means of a recess 236, they run in a cylinder shape, or that they run for example in the manner of an apex of a cone. Especially in connection with a recess 237, it is shown that the recess may have cross-sections which alter greatly in the direction of load—according to arrow 217. Thus it is possible, in the lower region of the supporting body 214, to use a recess 237 with a substantially larger cross-section, whilst a recess 238 adjoining thereto has only a fraction of the cross-sectional face. This recess 238 then extends from the excess 237 with a larger cross-section into the region of the flame-retardant layer 208 or respectively pentrates the latter, so that a direct connection is produced between the air-conducting channels or respectively caverns arranged in the flame-retardant layer 208 and the recess 237. Through the use of a relatively short recess 238 with a small cross-section, on movement of the user on the seat, a relatively high speed of air is achieved and there arises in the recess with a larger cross-sectional, immediately adjoining thereto, and which is open in a downward direction, a better exchange between the used air and the newly supplied external air 231, so that in a subsequent relief of load of the seat padding 235, a certain proportion of fresh air can also flow on after in this case.

Figure 16:
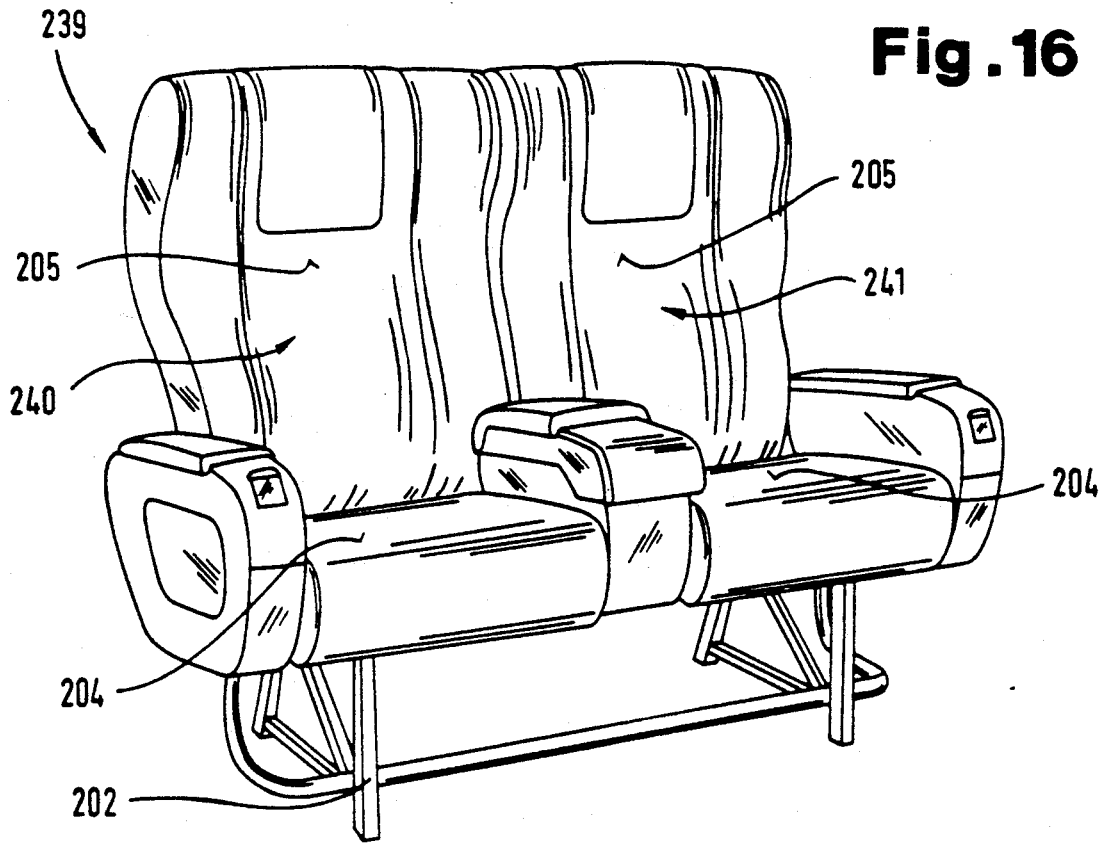
FIG. 16 shows a double bench seat with two seats according to the invention, for two people, in diagrammatic representation.

In FIG. 16, a double bench seat 239 with two seats 240, 241 is shown. Each seat 240, 241 consists of a seat padding 204 for a seat surface and a back padding 205 for a back rest. The paddings 204 and the paddings 205 of the two seats 240 and 241 are identical in construction, but are formed in mirror image. However, they may also be used for a single seat or for a multiple bench seat. In addition, a seat 240 or 241 may also consist of a single padding or several paddings.

The paddings 204 and 205 are mounted into a supporting frame, which is generally designated by 202. The supporting frame 202 may also have any other desired shape.

Figure 17:
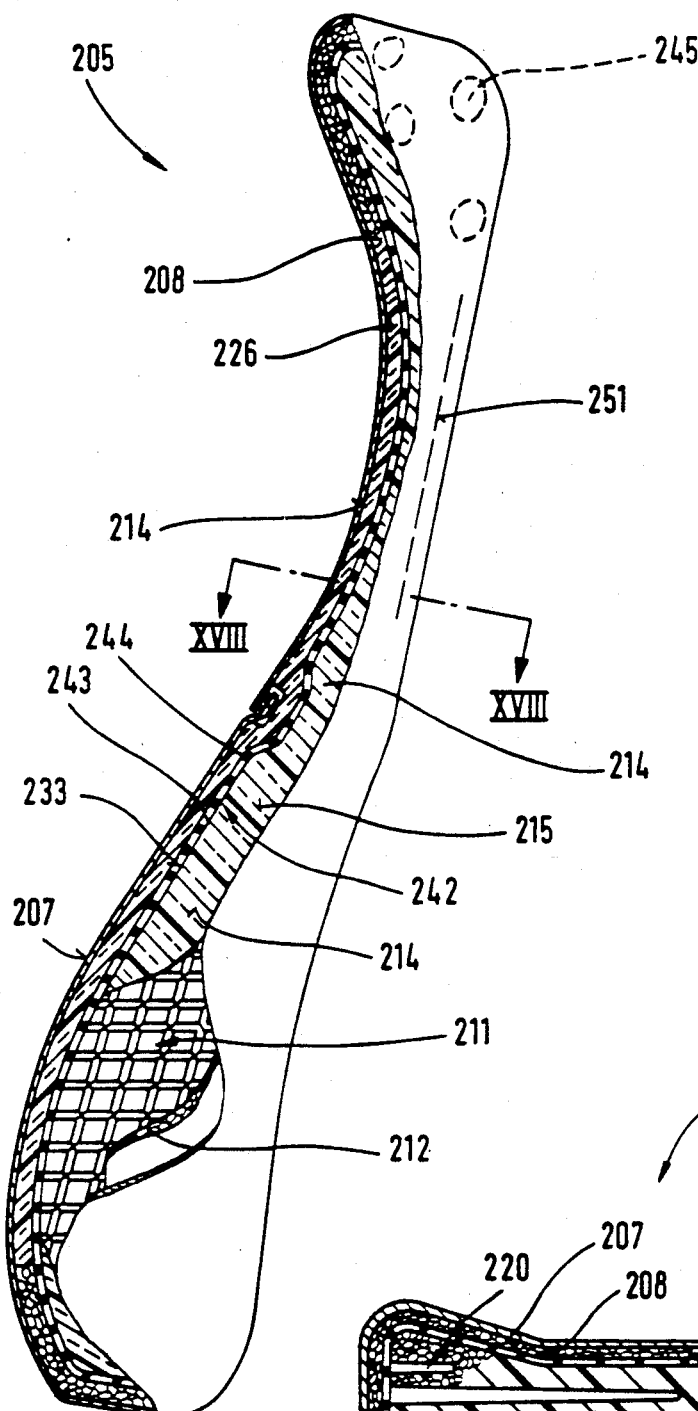
FIG. 17 shows the back padding of the double bench seat according to FIG. 16 in side view partially in section.
Figure 18:
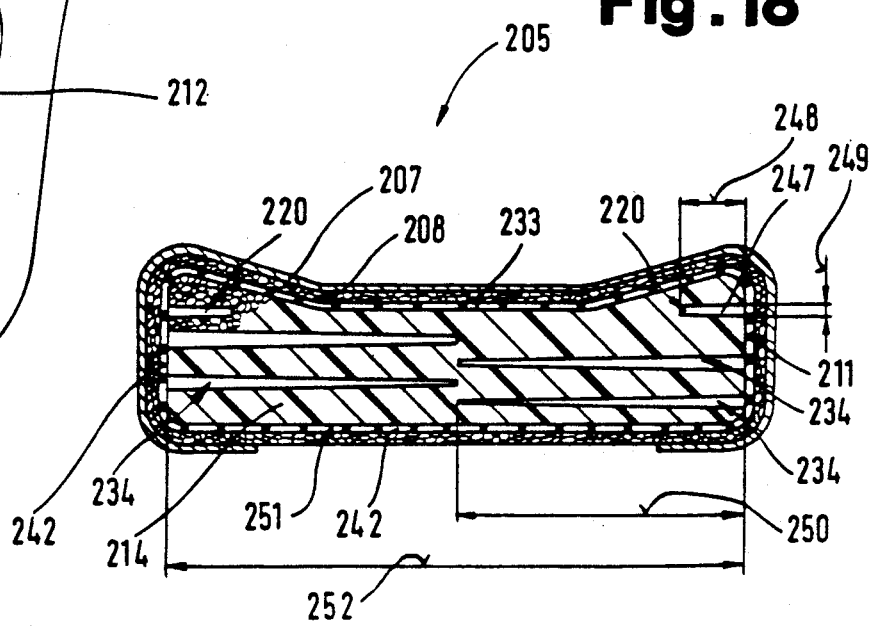
FIG. 18 shows the back padding in plan view, in section according to the lines XVIII—XVIII in FIG. 17.

In FIG. 17 and 18 a back padding 205 for a back rest is illustrated on an enlarged scale and partially in section. The padding 205 comprises a supporting body 214, which preferably consists of a cold shaped foam and is produced in a mould corresponding of the desired outer dimensions of the supporting body 214. It consists of an elastic open cell plastic foam. Preferably it is constructed in one piece. The plastic foam may be mixed with a pulverulent flame retardant 215, e.g. melamine resin and/or aluminium hydroxide, as indicated diagrammatically by small dashes in the region of the hatching. On the upper side of the supporting body 214 an intermediate layer 242 of a lattice or respectively mesh of high temperature resistant fibres 243 and 244 is arranged. This intermediate layer 242 is covered by a flame-retardant layer 208, which is provided on the side of the intermediate layer 211 facing away from the supporting body 214. This flame-retardant layer 208 is impregnated with a liquid flame retardant 226, as again indicated by dashes in the hatching. The liquid flame retardant 226 contains, for example, chlorine, bromine or phosphorus. It is advantageous if the liquid flame retardant is mixed with aluminium hydroxide, the grain size distribution of which is preferably between 0.2 and 110 μm. This flame-retardant layer 208 preferably consists of a polyether, in which the foamed plastic forms a part of a plastic foam block, which is subsequently impregnated with a liquid flame retardant. The flame-retardant layer 208, the intermediate layer 211 and the supporting body 214 are connected with each other in regions distributed over the surface, by means of an adhesive 245. The flame-retardant layer 208 is covered by a flame-resistant upholstery material 207 on the sude facing away from the supporting body 214.

It can be seen better from FIG. 18 that recesses 234 are arranged in the supporting body 214. These recesses 234 extend in the present example embodiment from lateral faces 246 in the direction of the centre of the padding. The recesses 234 are formed by cylindrical truncated cones in the present example embodiment. However, the shape of the recesses 234 is freely selectable here. Thus, instead of the cylindrical truncated cone, polygonal truncated pyramids or recesses with a cross-section in the shape of a truncated pyramid may be provided. It is advantageous here that, as can be seen from the drawing, openings 247 through the flame-retardant layer 208 and the intermediate layer 211 are covered. A length 248 and a diameter 249 in the region of the opening 247 may, as can likewise be seen from the drawing, be different. Through the differing lenth, a different ventilation may take place in the various regions distributed over the padding 205. In addition, in more intensely stressed regions, as in the back padding 205 in the central region, less recesses 234 may be arrange, or respectively recesses with a smaller diameter 249 or respectively volume. The length 248 of the recesses 234 will be smaller, for example, in the region facing the seat surface 233 than a length 250 in the region of a back surface 251. In addition to this is the fact that the recesses 234 in each case only extend over a portion of a supporting body width 252. However, it is also possible here instead of the recesses 234 shown in FIG. 17 and 8, to use recesses which extend over an entire supporting body width 252 from one lateral face 246 to the other lateral face.

Figure 19:
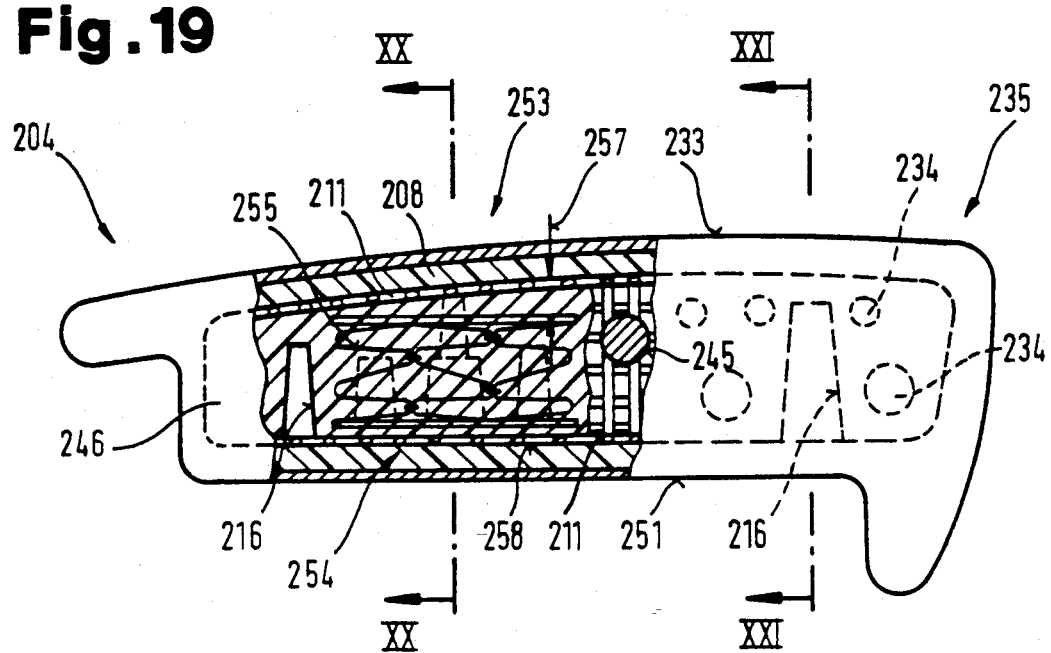
FIG. 19 shows the seat padding of the double bench seat according to FIG. 16 in side view partially in section.

In FIG. 19 a seat padding 204 is shown, which has a seat surface 233. In this sead padding 204, preferably there is associated with the seat surface 233, but also with the back face 251 and the lateral faces 246 the intermediate layer 211, which is formed from a mesh which may consist of high temperature resistant materials, such as for example threads, of glass, ceramic material or metal or respectively carbon, or of a humidity-tight barrier film. Moreover, in the region which is represented in opened-up state, in which the individual layers of the seat padding 204 can be seen better, the regions which are at a distance over the lateral face 246, in which the intermediate layer 211 is firmly stuck to the supporting body 214 with adhesive 245 and the flame-retardant layer 208 to the intermediate layer 211, can be seen. These regions, as indicated diagrammatically, are arranged distributed over the lateral faces 246 at a distance from each other, so that the throughput of air of the seat padding 204 is not disadvantageously influenced by the adhesive 245 to any substantial extent. For the attachment of the upholstery material 207, a burred tape may be arranged on the rear face of the seat padding 204.

As can additionally be seen from FIG. 19, in the region of a central seat surface 253 of the seat padding 204, on which, of example, a user's bottom rests, a metallic supporting device 254 is formed on, e.g. a spring core 255 of steel wire, in the supporting body 214. A cover face 256 of the spring core 255 is arranged here spaced apart from an upper side of the supporting body 214 or respectively the intermediate layer 211, at a distance 257, which may preferably be between 0.5 and 70 mm. Through this covering of the cover face 256 with plastic foam of the supporting body 214, in combination with the very elastic flame-retardant layer 208, a sufficient seating comfort is to be produced, so that even when the seat padding 204 is used by a very heavy person, its seating comfort is not impaired, or respectively the person does not sit directly on the metal parts of the spring core 255. A base face 258 of the spring core, on the other hand, is arranged so as to be almost flush with an underside of the supporting body 214 or respectively the intermediate layer 211. Thereby, in the use of seat paddings 204, in which the supporting body 214 is surrounded on all sides by an intermediate layer 211 and a flame-retardant layer 208, it is achieved that the stresses originating from the spring core 255 are evenly distributed over the intermediate layer 211. In seat paddings 204 or respectively back paddings 205, in which the region of the rear face 251 thereof no intermediate layer 211 or respectively no flame-retardant layer 208 is arranged, this has the advantage that the spring core 255 or respectively its base face 258 can rest directly on a supporting frame 202. As further shown by means of this example embodiment, and as is further explained in detail by means of the sectional representations, also in such an embodiment of a seat padding 204 with a spring core 255, the arrangement of recesses 216 or respectively 234 is possible. As can be seen roughly from this illustration, these recesses 216 may run vertically to the rear face 251 of the padding 204 or else parallel thereto, both vertically to the lateral face 246 and also parallel thereto.

Figure 20:
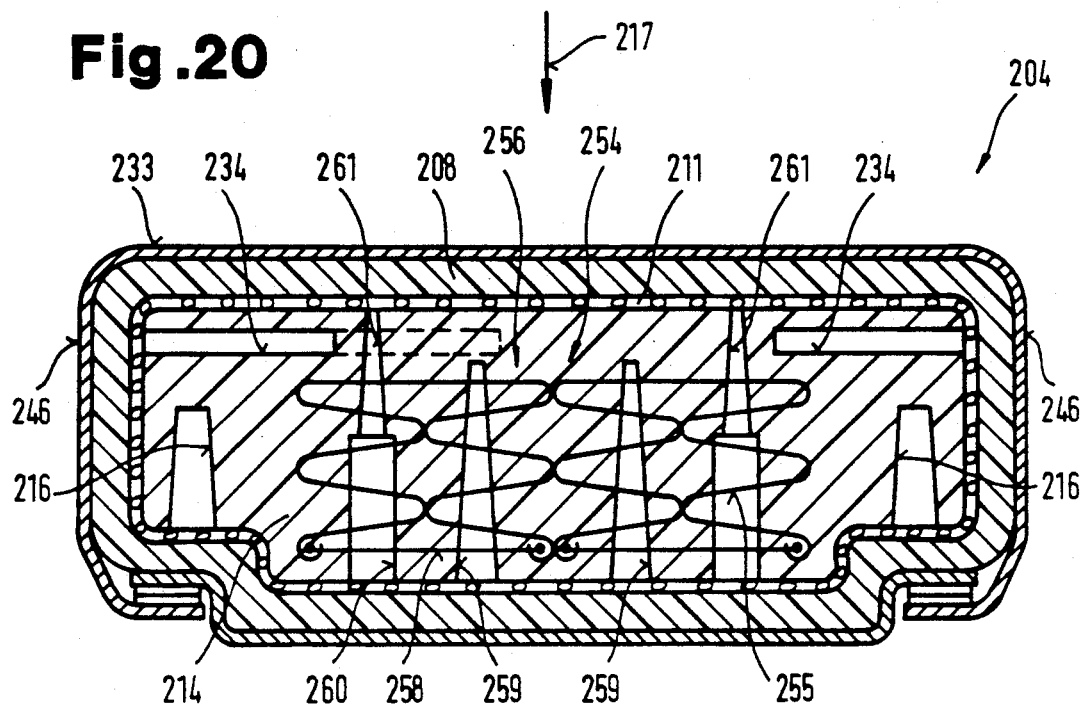
FIG. 20 shows the seat padding in front view in section according to the lines XX—XX in FIG. 19.

In FIG. 20 the path of the recesses 216 or respectively 234 is represented in detail. Amongst other factors, it can be seen from this illustration that recesses 259, 260, 261 may also extend through the interior of the spring core 255 or respectively of the supporting device 254. This supporting device 254 may also, for example, be formed from correspondingly constructed spring devices of plastic or plate spring elements or correspondingly constructed rubber spring elements.

As can be seen, the recesses 259 and 260 may extend vertically to a base face 258 of the spring core 255. They run in the interior between the spring core 255 formed by sprial spring elements and end for example like the recesses 259 in regions above the cover face 256 of the spring core 255. By means of the recesses 260, 261 it is, in addition, shown that recesses 260 with a larger cross-section may extend approximately into the central region of the spring core 255, adjoining which, then, are recesses 261 with a smaller cross-section, which extend for example through the intermediate layer 211 into the region of a flame-retardant layer 208. Through this, it is ensured that the layer of the supporting body 214, lying above the spring core 255, which layer is more intensely compressed by the greatest resistance which the spring core 255 offers against a deformation in the direction of load—arrow 217—is not weakened too much, but nevertheless, a relatively large quantity of air can be achieved through these recesses 261 and a better ventilation of the seat surface 233 can be achieved with the high exchange of air achieved when the seat is used by a person. This improved ventilation is also further achieved through the recesses 234, which run parallel to the seat surface 233, but vertically to the lateral faces 246. In particular, these recesses—as indicated by dashed lines—may also extend to far into the region above the supporting device 254 or respectively spring core 255, so that in lateral direction, in which the transportation of air, as already explained in further detailed by means of the preceding example embodiment, is able to be carried out more intensively, can be achieved. The small diameter compared with the thickness of the supporting body 214 leads to a pump effect, which functions in a similar manner to a diaphragm pump, in which the recesses 234 are almost entirely compressed and thereby blow the used warm air in the direction of the lateral faces 246, whilst with a slight relief of the load of the seat surface 233 in the opposite direction fresh air is sucked in at least into the recesses 234. Through the fact that on compression of the recess 234, and this applies in particular also to the recesses 261, a relatively high air prssure occurs through the pump effect, the air can also be pressed through the caverns or respectively open cells of the flame-retardant layer 208 and also the caverns of an intermediate layer 211. If an upper face of the supporting body 214 is additionally surrounded by a fluid- or respectively humidity-tight intermediate layer 211, then this must be opened in the region of the recesses 234, so that a corresponding exchange of air can be ensured through this barrier film.

Figure 21:
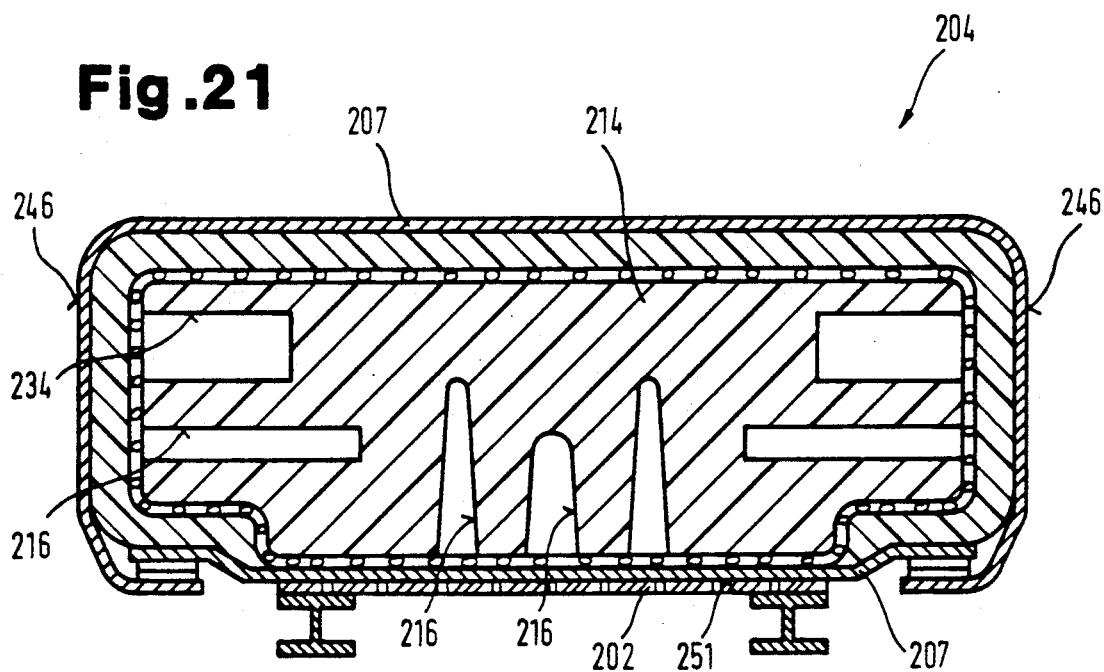
FIG. 21 shows the seat padding in front view in section according to the lines XI—XI in FIG. 19.

In FIG. 21 it is, additionally, shown that the recesses in a further cross-sectional region of the seat padding 204 may run differently or respectively a large cross-sectional face and a larger number of such recesses 234 or respectively 216 may be provided. In this example embodiment, in addition, differently from the illustration in FIG. 19, it is shown that the flame-retardant layer 208 and the intermediate layer 211 only extend into the region of the lateral faces 246 if the seat padding 204. An underside of the supporting body 214 lies here either on the intermediate layer 211, which may be formed by a corresponding high-strength woven material of wire or glass, a knitted material or a lattice, or else with the omission of this intermediate layer 211 lies directly on supports of the supporting frame. In order to achieve a higher stability and above all a higher resistance to damage to the supporting body 214, it is, moreover, also possible that instead of the intermediate layer 211 or additionally thereto, the rear face 251 of the seat padding 204, as indicated additionally by dashed lines, may be covered with an upholstery material 207.

Figure 22:
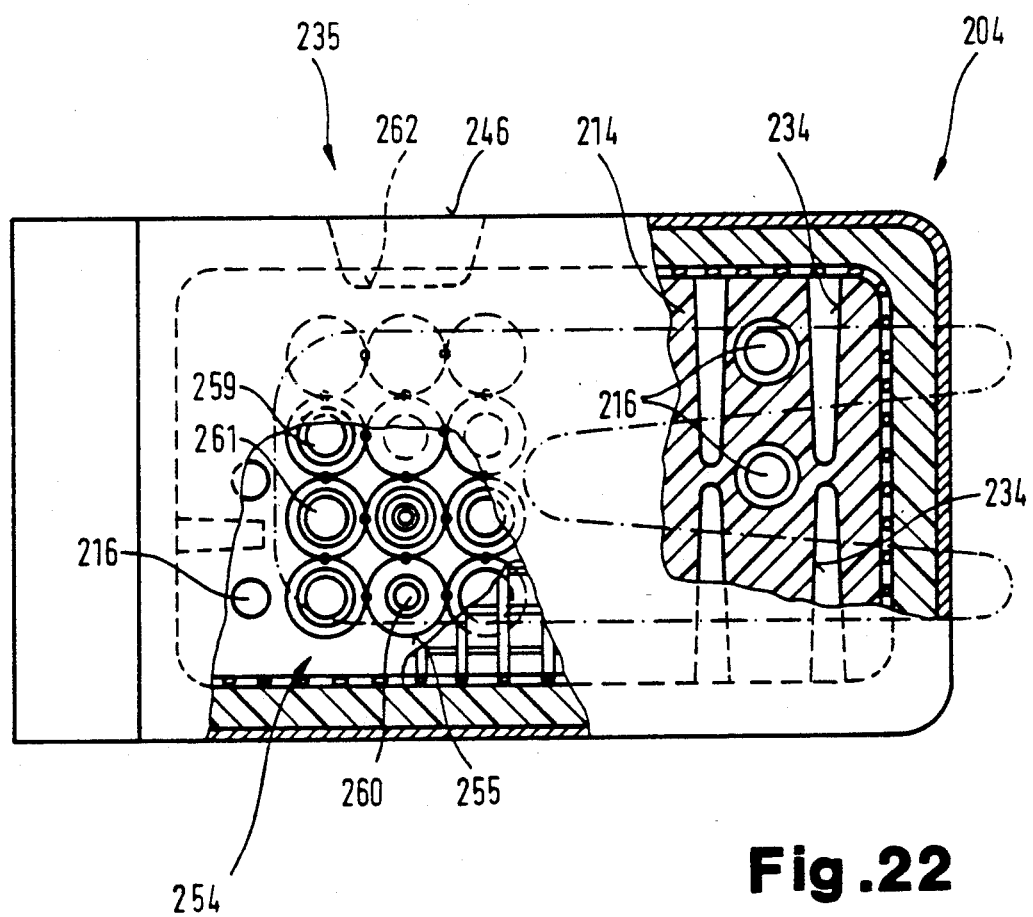
FIG. 22 shows the seat padding according to FIG. 19 in a view from below partially in section.

In FIG. 22, by means of a lower layer of the seat padding 204 according to FIG. 19 to 11 a possible division of the recesses 216 or respectively 234 and 259,260,261 is illustrated in connection with a supporting device 254, which is formed by a spring core 255. From this illustration it can be seen that in addition to the reinforcement of the central seat surface 253 achieved through the spring core 255, formed, as indicated by dot-and-dash lines by the bottom and the side of the upper thighs facing the seat padding 204, the number of recesses 216,234,259,260,261 is greater than in the remaining regions. Thereby, in these regions which are most intensely stressed both by bodily perspiration and also by weight, a corresponding exchange of air is achieved and through also using the supporting device 254, a long lifespan of the seat padding 204 is achieved. At the same time, thereby, however, a reduction in weight of the seat padding 204 is acheieved, because in the region in which the spring core is arranged, through the arrangement of a higher number of recesses 216,234,259,260 and 261 weight is saved with regard to the supporting body 214 which consists of plastic foam. If this saving of weight is not sufficient to absorb the excess weight of the spring core 255, then for example also in the lateral faces 246 recesses 262 may be provided, which then chiefly serve for the reduction of weight and only bring non-essential improvements to the "seating climate" of such a seat padding 204.

Of course, a spring core 255 or respectively a correspondingly constructed supporting device 254 is also able to be used with those seats in which the intermediate layer 211 is formed by a humidity- or respectively fluid-tight barrier film 212. In this case, through the steps or respectively processes described by means of FIGS. 11 to 5, it it is to be ensured that after the direct foaming-on of the supporting body 214 onto the barrier film 212 a sufficient passage pf air is produced in the direction of the upholstery material 207 or respectively the flame-retardant layer 208. This may, as already explained above, take place through the melting on or respectively milling off of the intermediate layer 211. If a barrier film consisting of high-strength fibres is arranged additionally to this fluid- or respectively liquid-tight barrier film 212, then this may also be removed in the region of the perforations with larger openings, for example by cutting out or separating individual springs or parts of the lattice, in order to achieve a greater permeability to air in the direction of the caverns formed in the flame-retardant layer 208 consisting of opening cell plastic foam.

Figure 23:
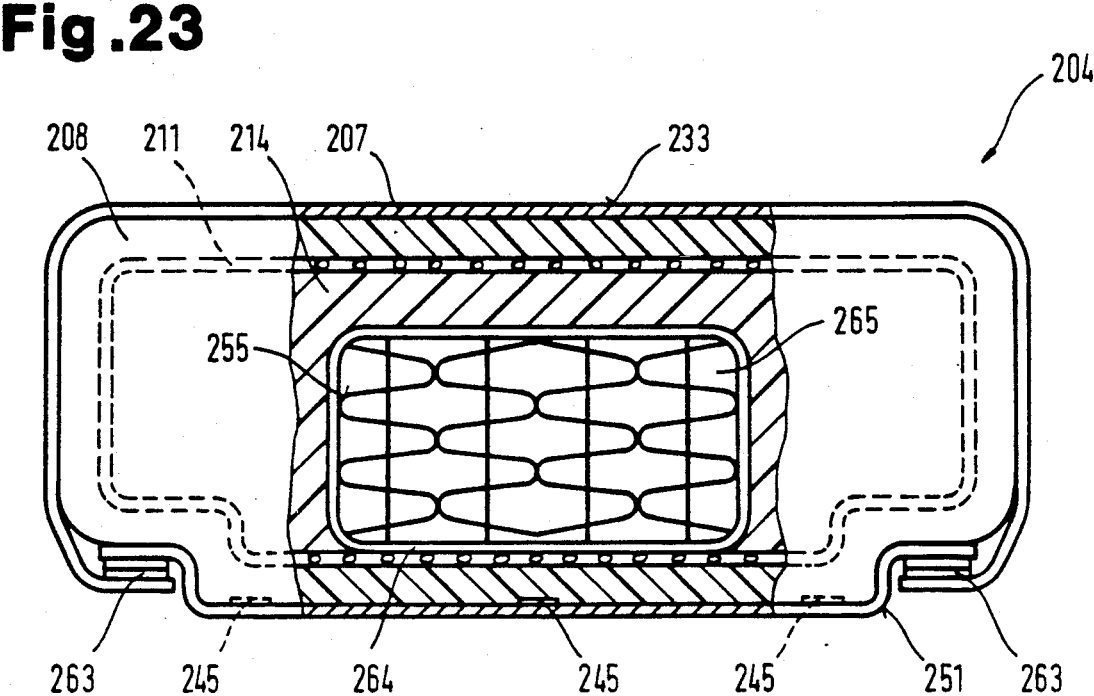
FIG. 23 shows a variant embodiment of a seat padding in front view in section.
Figure 24:
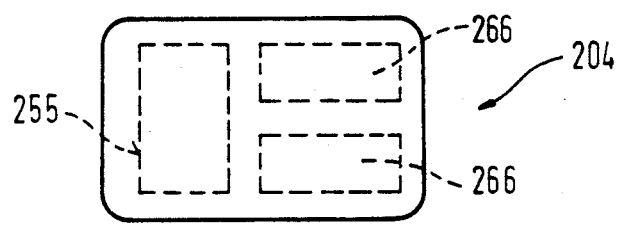
FIG. 24 shows the seat padding according to FIG. 12 in plan view.
Figure 25:
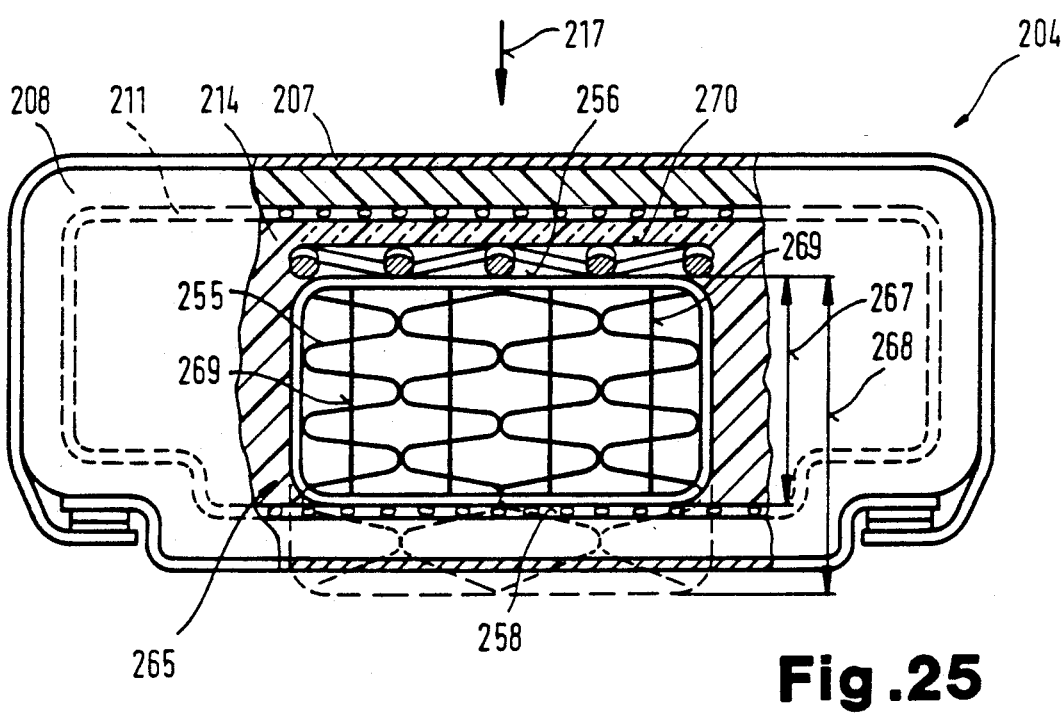
FIG. 25 shows another form of embodiment of a seat padding in front view in section.

In FIG. 23-25 further forms of embodiment are shown for a seat padding 204, in which the same reference numbers are used for its description for the same parts as in the preceding figures.

The seat padding according to FIG. 23 again consists of a non-flammable upholstery material 207, a flame-retardant layer 208, an intermediate layer 211 and also a supporting body 214. The non-flammable upholstery material 207 is connected on a rear face 251 of the seat padding 204 by means of an adhesive 245 with the flame-retardant layer 208, whilst the part of the upholstery material 207 facing the seat surface 233 is arranged so as to be replaceable by means of burred tapes 263.

In the interior of the supporting body 214, produced from a plastic form mixed with solid flame retardants, a spring core 255 is foamed in as supporting device 254. Whilst in the previously described forms of embodiment, the plastic foam of the supporting body 214 penetrates the spring core 255 entirely, in the present form of embodiment, the supporting device is surrounded by a plastic film 264, or respectively is encased therein. The plastic film 264 is air-tight and is also welded so as to be air-tight, so that with the supporting device 255 embedded therein, it acts as an air padding 265. In case of a stressing of the supporting device 254 or respectively the spring core 255, the air in the air padding 265 is more highly compressed, whereby after relief of the load, the seat, not least through the action of the spring core 255, returns into its original position. The advantage of this form of embodiment lies above all in that a corresponding volume of air is created in the supporting body 214, so that the seat padding 204 may be used under certain conditions as a float. It is only important here that the buoyancy of the seat padding 204 is so great that a person moving in the water receives sufficient buoyancy to be able to keep himself above water.

In FIG. 24 another variant embodiment of a seat padding 204 is shown, which may likewise be equipped with a spring core 255. In order to make possible a corresponding buoyancy of the seat padding 204 when used as a makeshift float, in this case in the region of the upper thighs of the user, floats 266 are foamed in. These floats may consist for example of styropor, polyethylene foam or any other material which produces a high degree of buoyancy. The advantage of the polyethylene foam in that this is, in addition, elastic.

In FIG. 25 another form of embodiment of a seat padding 204 is shown, which is composed in a similar manner to the seat padding according to FIG. 23, and comprises a non-flammable upholstery material 207, a flame-retardant layer 208, and intermediate layer 211 and a supporting body 214 consisting of plastic foam. In the supporting body, to increase the lifespan and to alter the spring characterisitc, a supporting device 254 is arranged, for example a spring core 255. In order to now be able to adapt the spring characteristic to particular preconditions, a height 267 of the supporting device 254 between a base face 258 and a cover face in a position foamed into the supporting body 214, is less than a thickness 268 of the supporting device 254 or spring core 255 in relaxed state. This pre-stressing is achieved in that the base face 258 and the cover face 256 are spaced apart from each other by means of tensioning elements 269, length of which, running vertically to the base face 258 is less than the thickness 268 of the spring core 255 in unstressed state. Thereby, it is possible to pre-stress the supporting device 254 or respectively the spring core 255 to any desired extent, so that the spring characteristic of such a seat padding 204 can be altered in any desired manner.

In this example embodiment it is, in addition, shown, that the cover face may be covered by an intermediate layer 270 or respectively such and intermediate layer may be placed directly onto the cover face 256. Thereby, a thicker layer is to be achieved, and through this a distribution of the load evenly onto the entire spring core 255, without parts of the spring core 255 being felt at pressure points as a disturbance to the user. Such an intermediate layer 270 may consist of a mesh or lattice or a knitted material or the like of wire or glass fibres, in which preferably a lattice is used, which has a correspondingly high inherent rigidity, so that it can span the cover face 256 in the manner of a bridge, in order to make possible a sufficient load distribution over the entire cover face of the spring core 255.

It is also, in addition, indicated in this example embodiment that a density of the plastic foam of the supporting body 214 in the region between the cover face 256 of the supporting device 254 and the intermediate layer 211 may be higher than the density of the foamed plastic in the remaining regions of the supporting body 214. This is indicated diagrammatically by a more dense hatching of the region between the cover face 256 and the intermediate layer 211. Thereby, it can be achieved that the loads which act on the seat 204 in the direction of load—arrow 217 —can be distributed evenly over the spring core 255. Through the greater hardness of a more dense foam of the supporting body 214, a type of elastic insert plate is created, which distributes the stresses, from the person sitting on the seat, which act partially in places, evenly onto the spring core 255. Thereby, pressure sites by individual parts of the spring core 255 are avoided.

This increase in the density of the foam material of the supporting body 214 in the region above the spring core 255 can take place in that an intermediate layer 270 is inserted, which leads to a more rapid cooling of the plastic foam and hence to a higher specific gravity. However, it is also possible, through corresponding temperature controls, to give this region of the mould a more rapid hardening on production of the supporting body, and hence a higher density, or respectively to make possible the formation of a thicker skin. This thicker skin has the advantage that it has a higher number of closed cells.

We claim:

1. A seat, in particular, for vehicles with a padding of foamed plastics comprising:
   a supporting body made from an open-cell elastic plastic foam with a first specific gravity;
   a flame-resistant upholstery material;
   said supporting body connected to said upholstering material with a flame-retardant layer made of an open-cell elastic foamed plastic with a second specific gravity different from the first;
   a non-flammable intermediate layer between said supporting body and said flame-retardant layer, which may be formed by an upholstery material; and
   said intermediate layer is formed from a lattice or mesh of high temperature resistant fibers or threads.

2. A seat, in particular, for vehicles, with a padding of foamed plastics comprising:
   a supporting body made from an open-cell elastic plastic foam with a first specific gravity;
   a flame-resistant upholstery material;
   said supporting body connected to said upholstering material with a flame-retardant layer made of an open-cell elastic foamed plastic with a second specific gravity different from the first;
   a liquid repellant intermediate layer between said supporting body and said flame-retardant layer; and said supporting body being foamed onto said intermediate layer.

3. A seat according to claim 1, wherein said intermediate layer is formed by a mesh or knitted material or threads or fibers of a flame-resistant material.

4. A seat according to claim 1, wherein said intermediate layer is formed by a lattice of threads or fibers.

5. A seat according to claim 1, wherein a mesh width of the lattices or meshes or knitted material is approximately 0.5 to 8 mm.

6. A seat according to claim 1, wherein the fibers or threads are comprised of glass or ceramic material.

7. A seat according to claim 1, wherein the fibers or threads are comprised of metal or carbon.

8. A seat according to claim 1, wherein the intermediate layer is connected with the supporting body and with the flame-retardant layer in regions distributed over the surface and spaced apart from each other.

9. A seat according to claim 1, wherein the connection of the supporting body or the intermediate layer or the flame-retardant layer or the upholstery material takes place by means of an adhesive applied in the regions, or by the foaming-on of the supporting body or of the flame-retardant layer.

10. A seat according to claim 1, wherein the upholstery material is laminated onto the intermediate layer; and
a connecting layer comprising a polyether foam or a polyester foam layer is arranged between the upholstery material and the intermediate layer and is glued to these.

11. A seat according to claim 1, wherein the plastic foam of the supporting body is mixed with a pulverulent flame retardant.

12. A seat according to claim 1, wherein the supporting body is constructed in one piece.

13. A seat according to claim 1, wherein the specific gravity of the plastic foam is approximately 15-60 kg/m$^3$.

14. A seat according to claim 1, wherein the intermediate layer has a weight of approximately 150-350 kg/m$^2$; and
the flame-retardant layer has a specific gravity of approximately 20-60 kg/m$^3$.

15. A seat according to claim 1, wherein the intermediate layer is formed by a barrier film comprising a PE-film or PU-film with a thickness of 50 μm.

16. A seat according to claim 1, wherein,
said supporting body has recesses; and
different cross-sectional slices of the supporting body which are at a distance from each other and run parallel to or perpendicular to an upper face, have an identical thickness, a different weight, and ration between recesses and foamed plastic.

17. A seat according to claim 1, wherein
said supporting body has a lateral face, an opposite lateral face, a rear face and an upper face, and has recesses; and
recesses are arranged in the supporting body extending from said lateral face or said rear face thereof in the direction of the opposite lateral face or said upper face.

18. A seat according to claim 1, wherein
said supporting body has thickness, width and contains recesses; and
the recesses extend only over a portion of the supporting body thickness or of the supporting body width.

19. A seat according to claim 18, wherein the recesses are formed as a cylinder or a cone or a pyramid.

20. A seat according to claim 18, wherein the volume or the depth of the recess is different in differing regions of the supporting body.

21. A seat according to claim 18, wherein the depth, or the volume, or the number of recesses is less in more intensely stressed regions of said supporting body.

22. A seat according to claim 18, wherein the supporting body has a region which is a central seat surface in said supporting body used as seat padding.

23. A seat according to claim 1, wherein
the seat is a cushion having a central seat surface and lateral faces and containing recesses; and
wherein the depth or the volume or the number of recesses in said seat cushion increases from the central seat surface in the direction of the lateral faces.

24. A seat according to claim 1,
further comprising a seat cushion containing recesses and a back cushion containing recesses; and
wherein the number or the volume, or a cross-sectional face of the recesses parallel to the upper face of the seat cushion or back cushion is greater in the regions of the back cushion and the seat cushion, which face each other, than in the remaining regions thereof.

25. A seat according to claim 24, wherein the recesses are arranged in the regions of the seat cushion and back cushion, which face each other.

26. A seat according to claim 25,
wherein said seat cushion has seat padding and said back cushion has back padding; and
wherein these regions extend over approximately 30% of a length of the seat padding or respectively back padding running perpendicular to the back cushion or respectively to the seat cushion.

27. A seat according to claim 24, wherein the recesses extend into the region of the intermediate layer.

28. A seat according to claim 27, wherein the intermediate layer is provided with an opening in the region of the recess.

29. A seat according to claim 1,
further comprising recesses, open cells in the flame-retardant layer, and openings in the intermediate layer; and
wherein an interior of the recesses is connected directly with an interior of open cells of the flame-retardant layer via the openings in the intermediate layer.

30. A seat according to claim 29, wherein a cross-sectional face of the opening in the intermediate layer corresponds to a cross-section of the recess in the region immediately adjacent to the intermediate layer.

31. A seat according to claim 29, wherein the flame-retardant layer and a flame-resistant upholstery material arranged in front of it, are provided with bores having a cross-section of 0.5 to 5 mm, which open out into the interior of the recesses.

32. A seat according to claim 1, wherein
the supporting body has a more intensely stressed zone; and
in the supporting body in the region of the more intensely stresses zone, a supporting body comprising a spring metal core is contained by foam.

33. A seat according to claim 32, wherein
the spring core has a base face; and said base face of the spring core is arranged so as to be approximately flush with an underside of the supporting body.

34. A seat according to claim 33, wherein
the spring core has a cover face; and
said cover face of the spring core is arranged spaced apart from an upper side of the supporting body at a distance of from 5 to 70 mm.

35. A seat according to claim 34, wherein
the spring core has a height and a thickness; and
said height of the spring core which is formed into the supporting body is less than the thickness of the spring core in the unstressed state.

36. A seat according to claim 35,
further comprising tensioning elements; and
wherein the base face and the cover face of the spring core are spaced apart from each other by said tensioning elements, the length of which running perpendicular to the base face is less than the thickness of the spring core in the unstressed state.

37. A seat according to claim 36, wherein
said spring core has end face edges; and
said end face edges of the spring core are arranged at a distance from the lateral faces and a rear end face of the supporting body.

38. A seat according to claim 37, wherein in the region of the spring core recesses are arranged running perpendicular to a lateral face or upper face of the seat cushion.

39. A seat according to claim 38, wherein an upper face of the recesses is arranged at a distance from the spring core or from parts of the spring core.

40. A seat according to claim 39, wherein in the supporting body between the lateral edges of the spring core and the lateral faces of the supporting body, recesses are arranged running vertically to the upper face or lateral face of the supporting cushion.

41. A seat according to claim 1,
further comprising recesses; and
wherein the intermediate layer or flame-retardant layer covers an inlet opening of the recesses in the region of the lateral face or rear face of the supporting body.

42. A seat according to claim 41, wherein an upper face of the recesses is lined with the intermediate layer or flame-retardant layer.

43. A seat according to claim 42, wherein an upper face of the recesses is coated with a flame-retardant layer.

44. A seat according to claim 1, further comprising a connecting device arranged between the flame-retardant layer and an upholstery material, and is directly connected with the intermediate layer.

45. A seat according to claim 44, wherein the connecting device is connected with the intermediate layer and with the flame-retardant layer in regions distributed over the surface of the connecting device and spaced apart from each other.

46. A seat according to claim 44, wherein the connecting device for the mounting of the upholstery material is connected with the intermediate layer by threads or fibers which penetrate the flame-retardant layer.

47. A seat according to claim 44, wherein the connecting device for the mounting of the upholstery material is connected with the intermediate layer by an adhesive layer penetrating the flame-retardant layer.

48. A seat according to claim 44, wherein the connecting device is connected with the flame-retardant layer by an adhesive in regions at a distance from the adhesive layers and from each other.

49. A seat according to claim 48, wherein the adhesive of the adhesive layer remains elastic after hardening.

50. A seat according to claim 48, wherein the adhesive has a short hardening time.

51. A seat according to claim 48, wherein in the region of the adhesive layer or of the threads, the flame-retardant layer is compacted to a smaller thickness.

52. A seat according to claim 48, wherein the adhesive for the adhesive layer is injected into the flame-retardant layer in the regions which are spaced apart from each other.

53. A seat according to claim 44, wherein the connecting device is formed by a burred tape or a supporting tape for a zip fastener.

54. A seat according to claim 1, wherein between the flame-retardant layer and the flame-resistant upholstery material, a further layer of flame-resistant upholstery material is arranged in places.

55. A seat according to claim 54, wherein the further layer of flame-resistant upholstery material is glued onto the flame-retardant layer.

* * * * *

UNITED STATES PATENT AND TRADEMARK OFFICE
CERTIFICATE OF CORRECTION

PATENT NO. : 5,085,487
DATED : February 4, 1992
INVENTOR(S) : Rudolf Weingartner et al It is certified that error appears in the above-identified patent and that said Letters Patent is hereby corrected as shown below:

Cover page, column 1, item 75, line 2, delete "Moseneder" and insert --Möseneder--; and item 73, delete line 2 in its entirety and substitute therefor --Gesellschaft m.b.H., Kremsmünster,--.

Signed and Sealed this

Twenty-sixth Day of July, 1994

Attest:

BRUCE LEHMAN

*Attesting Officer*  *Commissioner of Patents and Trademarks*